United States Patent [19]

Dahme

[11] Patent Number: 4,555,763
[45] Date of Patent: Nov. 26, 1985

[54] METHOD AND APPARATUS FOR STORAGE AND ACCESSING OF CHARACTERS, AND ELECTRONIC PRINTER EMPLOYING SAME

[75] Inventor: Jerome R. Dahme, Berwyn, Pa.

[73] Assignee: Decision Data Computer Corp., Horsham, Pa.

[21] Appl. No.: 394,436

[22] Filed: Jul. 1, 1982

[51] Int. Cl.$^4$ .......................... G06F 3/14; B41B 19/00
[52] U.S. Cl. ................................. 364/521; 101/93.04; 340/748; 340/750; 346/161; 358/300; 364/523
[58] Field of Search ................ 364/521, 523; 340/748, 340/750; 346/153.1, 161; 358/300, 302; 101/93.04

[56] References Cited

U.S. PATENT DOCUMENTS

| | | | |
|---|---|---|---|
| 3,174,427 | 3/1965 | Taylor | 101/93.04 |
| 4,199,815 | 4/1980 | Kyte et al. | 340/750 X |
| 4,231,096 | 10/1980 | Hansen et al. | 340/748 X |
| 4,257,711 | 3/1981 | Nakajima | 364/523 X |
| 4,279,002 | 7/1981 | Rider | 358/300 X |
| 4,322,717 | 3/1982 | Iida | 358/300 X |
| 4,338,673 | 7/1982 | Brown | 364/523 |
| 4,342,096 | 7/1982 | McDevitt | 364/523 X |
| 4,446,472 | 5/1984 | Kato et al. | 346/153.1 |

Primary Examiner—Errol A. Krass
Assistant Examiner—Edward R. Cosimano
Attorney, Agent, or Firm—Charles H. Lindrooth; Albert L. Free

[57] ABSTRACT

Electronic printer apparatus in which the intensity of the beam of a cathode-ray tube is controlled during successive beam sweeps to display and project onto a rotating electrostatically-charged surface an image of successive slices through a row of characters to be printed, the latent line images thus formed being then converted to a toner image for subsequent transfer to a page of paper. Digital information bits organized in bytes and representing slices through each character are stored in respective areas of a permanent memory storage device. The appropriate slices of the characters are accessed in response to character-representing input signals, and are read out serially to control the beam intensity during each sweep and thus display, along the sweep, the desired slice through the row of characters. The stored bits for each character slice are organized into various integral numbers of x-bit and y-bit bytes, preferably 8-bit and 6-bit bytes, the number of bytes of each type for each character slice depending on the bit width of the corresponding character cell; there are no extra or left-over bits beyond these included in the two types of bytes. The so-stored bytes of differing bit content are accessed byte-by-byte, enabling simplification and reduced cost of the apparatus.

28 Claims, 21 Drawing Figures

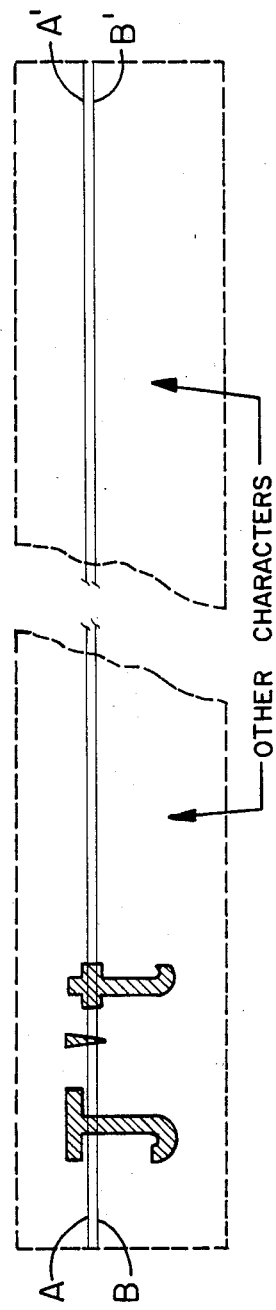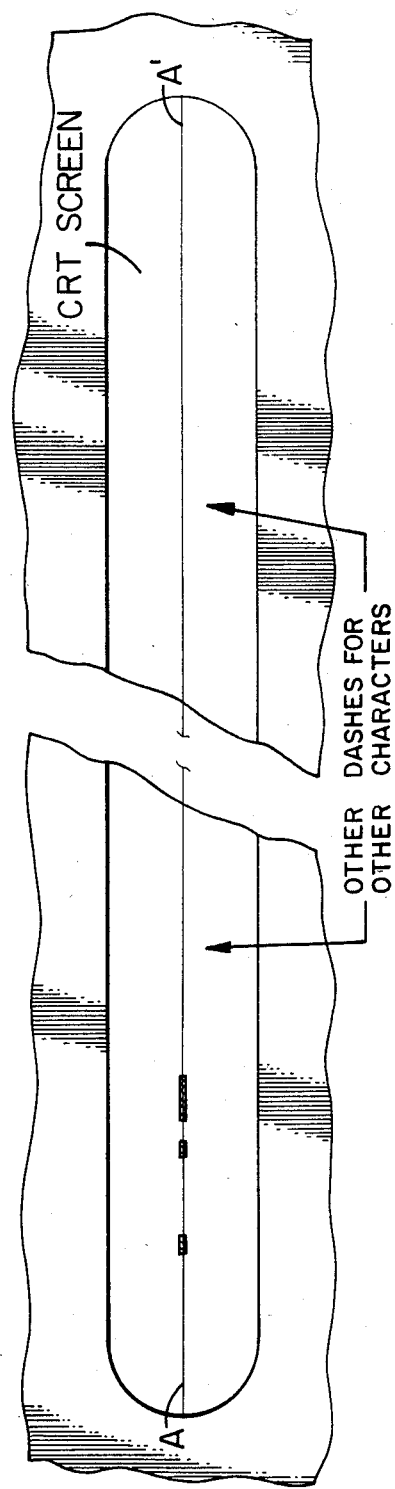

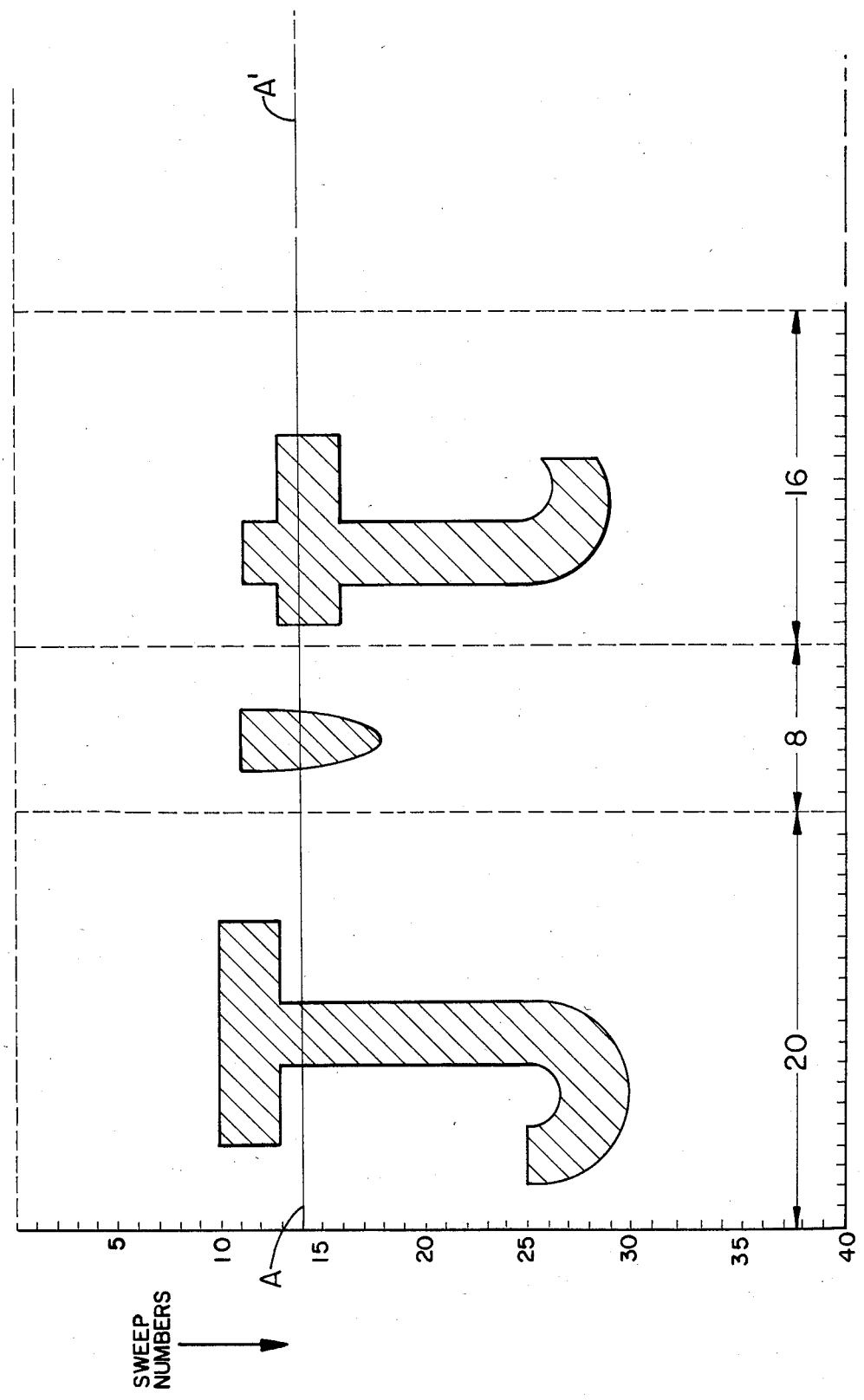

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1 |   |   | 2 |   |   | 3 |   |   | 4 |   |   | 5 |   |   |   |
| 01 | 6 |   |   | 7 |   |   | 8 |   |   | 9 |   |   | 10|   |   |   |
| 02 | 11|   |   | 12|   |   | 13|   |   | 14|   |   | 15|   |   |   |
| 03 | 16|   |   | 17|   |   | 18|   |   | 19|   |   | 20|   |   |   |
| 04 | 21|   |   | 22|   |   | 23|   |   | 24|   |   | 25|   |   |   |
| 05 | 26|   |   | 27|   |   | 28|   |   | 29|   |   | 30|   |   |   |
| 06 | 31|   |   | 32|   |   | 33|   |   | 34|   |   | 35|   |   |   |
| 07 | 36|   |   | 37|   |   | 38|   |   | 39|   |   | 40|   |   |   |
| 08 | N | E | X | T |   | C | H | A | R | A | C | T | E | R |   |   |
| 09 |   |   |   |   |   |   |   |   |   |   |   |   |   |   |   |   |
| 0A |   |   |   |   |   |   |   |   |   |   |   |   |   |   |   |   |
| 0B |   |   |   |   |   |   |   |   |   |   |   |   |   |   |   |   |
|etc.|   |   |   |   |   |   |   |   |   |   |   |   |   |   |   |   |

Numbers refer to sweeps, Blank boxes are unused byte-locations. Underlined boxes contain 6 significant bits of data.

FONT FORMAT    3A

ORIENTATION    Portrait

CPI    PS

CELL SIZE    8    WIDE,    40    HIGH

Notes:
1. Cycle sequence: 8
2. Addressing sequence: 0-3-6-9-C
3. Only character is apostrophe.

FIG. 6

STORAGE ORGANIZATION
CHARACTER GENERATOR ROM

|    | 0   | 1   | 2 | 3   | 4   | 5 | 6   | 7   | 8 | 9   | A   | B | C   | D   | E | F |
|----|-----|-----|---|-----|-----|---|-----|-----|---|-----|-----|---|-----|-----|---|---|
| 00 | 1A  | 1B  |   | 2A  | 2B  |   | 3A  | 3B  |   | 4A  | 4B  |   | 5A  | 5B  |   |   |
| 01 | 6A  | 6B  |   | 7A  | 7B  |   | 8A  | 8B  |   | 9A  | 9B  |   | 10A | 10B |   |   |
| 02 | 11A | 11B |   | 12A | 12B |   | 13A | 13B |   | 14A | 14B |   | 15A | 15B |   |   |
| 03 | 16A | 16B |   | 17A | 17B |   | 18A | 18B |   | 19A | 19B |   | 20A | 20B |   |   |
| 04 | 21A | 21B |   | 22A | 22B |   | 23A | 23B |   | 24A | 24B |   | 25A | 25B |   |   |
| 05 | 26A | 26B |   | 27A | 27B |   | 28A | 28B |   | 29A | 29B |   | 30A | 30B |   |   |
| 06 | 31A | 31B |   | 32A | 32B |   | 33A | 33B |   | 34A | 34B |   | 35A | 35B |   |   |
| 07 | 36A | 36B |   | 37A | 37B |   | 38A | 38B |   | 39A | 39B |   | 40A | 40B |   |   |
| 08 | N   | E   | X | T   |     | C | H   | A   | R | A   | C   | T | E   | R   |   |   |
| 09 |     |     |   |     |     |   |     |     |   |     |     |   |     |     |   |   |
| 0A |     |     |   |     |     |   |     |     |   |     |     |   |     |     |   |   |
| 0B |     |     |   |     |     |   |     |     |   |     |     |   |     |     |   |   |
| etc. |   |     |   |     |     |   |     |     |   |     |     |   |     |     |   |   |

Numbers refer to sweeps, Blank boxes are unused byte-locations. Underlined boxes contain 6 significant bits of data.

FONT FORMAT _3B_

ORIENTATION _Portrait_

CPI _PS_

CELL SIZE _12_ WIDE, _40_ HIGH

Notes:
1. Cycle sequence: _6/6_
2. Addressing sequence: _0-3-6-9-C_
3. Characters are: space ! ( ) , . : ; I [ ] i j l { } |

FIG. 7

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B |  | 2A | 2B |  | 3A | 3B |  | 4A | 4B |  | 5A | 5B |  |  |
| 01 | 6A | 6B |  | 7A | 7B |  | 8A | 8B |  | 9A | 9B |  | 10A | 10B |  |  |
| 02 | 11A | 11B |  | 12A | 12B |  | 13A | 13B |  | 14A | 14B |  | 15A | 15B |  |  |
| 03 | 16A | 16B |  | 17A | 17B |  | 18A | 18B |  | 19A | 19B |  | 20A | 20B |  |  |
| 04 | 21A | 21B |  | 22A | 22B |  | 23A | 23B |  | 24A | 24B |  | 25A | 25B |  |  |
| 05 | 26A | 26B |  | 27A | 27B |  | 28A | 28B |  | 29A | 29B |  | 30A | 30B |  |  |
| 06 | 31A | 31B |  | 32A | 32B |  | 33A | 33B |  | 34A | 34B |  | 35A | 35B |  |  |
| 07 | 36A | 36B |  | 37A | 37B |  | 38A | 38B |  | 39A | 39B |  | 40A | 40B |  |  |
| 08 | N | E | X | T |  | C | H | A | R | A | C | T | E | R |  |  |
| 09 |  |  |  |  |  |  |  |  |  |  |  |  |  |  |  |  |
| 0A |  |  |  |  |  |  |  |  |  |  |  |  |  |  |  |  |
| 0B |  |  |  |  |  |  |  |  |  |  |  |  |  |  |  |  |
| etc. |  |  |  |  |  |  |  |  |  |  |  |  |  |  |  |  |

FONT FORMAT   3C

ORIENTATION   Portrait

CPI   PS

CELL SIZE   16   WIDE,   40   HIGH

Numbers refer to sweeps, Blank boxes are unused byte-locations. Underlined boxes contain 6 significant bits of data.

Notes:
1. Cycle sequence: 8/8
2. Addressing sequence: 0-3-6-9-C
3. Characters are " / \ f r s t

FIG. 8

STORAGE ORGANIZATION
CHARACTER GENERATOR ROM

|     | 0   | 1   | 2   | 3 | 4   | 5   | 6   | 7 | 8   | 9   | A   | B | C   | D   | E   | F |
|-----|-----|-----|-----|---|-----|-----|-----|---|-----|-----|-----|---|-----|-----|-----|---|
| 00  | 1A  | 1B  | 1C  |   | 2A  | 2B  | 2C  |   | 3A  | 3B  | 3C  |   | 4A  | 4B  | 4C  |   |
| 01  | 5A  | 5B  | 5C  |   | 6A  | 6B  | 6C  |   | 7A  | 7B  | 7C  |   | 8A  | 8B  | 8C  |   |
| 02  | 9A  | 9B  | 9C  |   | 10A | 10B | 10C |   | 11A | 11B | 11C |   | 12A | 12B | 12C |   |
| 03  | 13A | 13B | 13C |   | 14A | 14B | 14C |   | 15A | 15B | 15C |   | 16A | 16B | 16C |   |
| 04  | 17A | 17B | 17C |   | 18A | 18B | 18C |   | 19A | 19B | 19C |   | 20A | 20B | 20C |   |
| 05  | 21A | 21B | 21C |   | 22A | 22B | 22C |   | 23A | 23B | 23C |   | 24A | 24B | 24C |   |
| 06  | 25A | 25B | 25C |   | 26A | 26B | 26C |   | 27A | 27B | 27C |   | 28A | 28B | 28C |   |
| 07  |     |     |     |   |     |     |     |   |     |     |     |   |     |     |     |   |
| 08  | N   | E   | X   | T |     | C   | H   | A | R   | A   | C   | T | E   | R   |     |   |
| 09  |     |     |     |   |     |     |     |   |     |     |     |   |     |     |     |   |
| 0A  |     |     |     |   |     |     |     |   |     |     |     |   |     |     |     |   |
| 0B  |     |     |     |   |     |     |     |   |     |     |     |   |     |     |     |   |
| etc.|     |     |     |   |     |     |     |   |     |     |     |   |     |     |     |   |

Numbers refer to sweeps, Blank boxes are unused byte-locations. Underlined boxes contain 6 significant bits of data.

FONT FORMAT    7
ORIENTATION    Portrait
CPI            13.3
CELL SIZE      18    WIDE,    28    HIGH Notes:
1. Cycle sequence: 6/6/6
2. Addressing sequence: 0-4-8-C
3. Format 4 rotated.

FIG. 9

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B | 1C | 2A | 2B | 2C | 3A | 3B | 3C | 4A | 4B | 4C | 5A | 5B | 5C | |
| 01 | 6A | 6B | 6C | 7A | 7B | 7C | 8A | 8B | 8C | 9A | 9B | 9C | 10A | 10B | 10C | |
| 02 | 11A | 11B | 11C | 12A | 12B | 12C | 13A | 13B | 13C | 14A | 14B | 14C | 15A | 15B | 15C | |
| 03 | 16A | 16B | 16C | 17A | 17B | 17C | 18A | 18B | 18C | 19A | 19B | 19C | 20A | 20B | 20C | |
| 04 | 21A | 21B | 21C | 22A | 22B | 22C | 23A | 23B | 23C | 24A | 24B | 24C | 25A | 25B | 25C | |
| 05 | 26A | 26B | 26C | 27A | 27B | 27C | 28A | 28B | 28C | 29A | 29B | 29C | 30A | 30B | 30C | |
| 06 | 31A | 31B | 31C | 32A | 32B | 32C | 33A | 33B | 33C | 34A | 34B | 34C | 35A | 35B | 35C | |
| 07 | 36A | 36B | 36C | 37A | 37B | 37C | 38A | 38B | 38C | 39A | 39B | 39C | 40A | 40B | 40C | |
| 08 | N | E | X | T | | C | H | A | R | A | C | T | E | R | | |
| 09 | | | | | | | | | | | | | | | | |
| 0A | | | | | | | | | | | | | | | | |
| 0B | | | | | | | | | | | | | | | | |
| etc.| | | | | | | | | | | | | | | | |

Numbers refer to sweeps, Blank boxes are unused byte-locations. Underlined boxes contain 6 significant bits of data.

FONT FORMAT  1 & 3D
ORIENTATION  Portrait
CPI  12 & PS
CELL SIZE  20  WIDE,  40  HIGH Notes:
1. Cycle sequence: 8/6/6
2. Addressing sequence: 0-3-6-9-C
3. For PS, characters are $ * + - numerics < = > ?
   J S ^ ' a b c d e g h k n o
   p q u v x y z ~

FIG. 10

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B | 1C | 2A | 2B | 2C | 3A | 3B | 3C | 4A | 4B | 4C | 5A | 5B | 5C | |
| 01 | 6A | 6B | 6C | 7A | 7B | 7C | 8A | 8B | 8C | 9A | 9B | 9C | 10A | 10B | 10C | |
| 02 | 11A | 11B | 11C | 12A | 12B | 12C | 13A | 13B | 13C | 14A | 14B | 14C | 15A | 15B | 15C | |
| 03 | 16A | 16B | 16C | 17A | 17B | 17C | 18A | 18B | 18C | 19A | 19B | 19C | 20A | 20B | 20C | |
| 04 | 21A | 21B | 21C | 22A | 22B | 22C | 23A | 23B | 23C | 24A | 24B | 24C | 25A | 25B | 25C | |
| 05 | 26A | 26B | 26C | 27A | 27B | 27C | 28A | 28B | 28C | 29A | 29B | 29C | 30A | 30B | 30C | |
| 06 | 31A | 31b | 31C | 32A | 32B | 32C | 33A | 33B | 33C | 34A | 34B | 34C | 35A | 35B | 35C | |
| 07 | 36A | 36B | 36C | 37A | 37B | 37C | 38A | 38B | 38C | 39A | 39B | 39C | 40A | 40B | 40C | |
| 08 | N | E | X | T | | C | H | A | R | A | C | T | E | R | | |
| 09 | | | | | | | | | | | | | | | | |
| 0A | | | | | | | | | | | | | | | | |
| 0B | | | | | | | | | | | | | | | | |
| etc. | | | | | | | | | | | | | | | | |

Numbers refer to sweeps, Blank boxes are unused byte-locations. Underlined boxes contain 6 significant bits of data.

FONT FORMAT _2 & 3E_

ORIENTATION _Portrait_

CPI _10 & PS_

CELL SIZE _24_ WIDE, _40_ HIGH

Notes:
1. Cycle sequence: _8/8/8_
2. Addressing sequence: _0-3-6-9-C_
3. For PS, characters are _B E F L P T V Z #_

FIG. 11

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B | 1C | 1D | 2A | 2B | 2C | 2D | 3A | 3B | 3C | 3D | 4A | 4B | 4C | 4D |
| 01 | 5A | 5B | 5C | 5D | 6A | 6B | 6C | 6D | 7A | 7B | 7C | 7D | 8A | 8B | 8C | 8D |
| 02 | 9A | 9B | 9C | 9D | 10A | 10B | 10C | 10D | 11A | 11B | 11C | 11D | 12A | 12B | 12C | 12D |
| 03 | 13A | 13B | 13C | 13D | 14A | 14B | 14C | 14D | 15A | 15B | 15C | 15D | 16A | 16B | 16C | 16D |
| 04 | 17A | 17B | 17C | 17D | 18A | 18B | 18C | 18D | 19A | 19B | 19C | 19D | 20A | 20B | 20C | 20D |
| 05 | 21A | 21B | 21C | 21D | 22A | 22B | 22C | 22D | 23A | 23B | 23C | 23D | 24A | 24B | 24C | 24D |
| 06 | 25A | 25B | 25C | 25D | 26A | 26B | 26C | 26D | 27A | 27B | 27C | 27D | 28A | 28B | 28C | 28D |
| 07 | 29A | 29B | 29C | 29D | 30A | 30B | 30C | 30D | 31A | 31B | 31C | 31D | 32A | 32B | 32C | 32D |
| 08 | N | E | X | T |   | C | H | A | R | A | C | T | E | R |   |   |
| 09 |   |   |   |   |   |   |   |   |   |   |   |   |   |   |   |   |
| 0A |   |   |   |   |   |   |   |   |   |   |   |   |   |   |   |   |
| 0B |   |   |   |   |   |   |   |   |   |   |   |   |   |   |   |   |
| etc. |   |   |   |   |   |   |   |   |   |   |   |   |   |   |   |   |

FONT FORMAT   3F

ORIENTATION   Portrait

CPI           PS

CELL SIZE     28   WIDE,   40   HIGH

Numbers refer to sweeps, Blank boxes are unused byte-locations. Underlined boxes contain 6 significant bits of data.

Notes:
1. Cycle sequence: 8/8/6/6
2. Addressing sequence: 0-4-8-C
3. Characters are    & A C D G H K N O Q R U X Y w
4. Sweeps 33-40 occur, but data bytes are jammed to zeros. Characters in this format cannot descend below sweep 32.

FIG. 12

STORAGE ORGANIZATION
CHARACTER GENERATOR ROM

|    | 0   | 1   | 2   | 3   | 4 | 5   | 6   | 7   | 8   | 9 | A   | B   | C   | D   | E | F |
|----|-----|-----|-----|-----|---|-----|-----|-----|-----|---|-----|-----|-----|-----|---|---|
| 00 | 1A  | 1B  | 1C  | 1D  |   | 2A  | 2B  | 2C  | 2D  |   | 3A  | 3B  | 3C  | 3D  |   |   |
| 01 | 4A  | 4B  | 4C  | 4D  |   | 5A  | 5B  | 5C  | 5D  |   | 6A  | 6B  | 6C  | 6D  |   |   |
| 02 | 7A  | 7B  | 7C  | 7D  |   | 8A  | 8B  | 8C  | 8D  |   | 9A  | 9B  | 9C  | 9D  |   |   |
| 03 | 10A | 10B | 10C | 10D |   | 11A | 11B | 11C | 11D |   | 12A | 12B | 12C | 12D |   |   |
| 04 | 13A | 13B | 13C | 13D |   | 14A | 14B | 14C | 14D |   | 15A | 15B | 15C | 15D |   |   |
| 05 | 16A | 16B | 16C | 16D |   | 17A | 17B | 17C | 17D |   | 18A | 18B | 18C | 18D |   |   |
| 06 |     |     |     |     |   |     |     |     |     |   |     |     |     |     |   |   |
| 07 |     |     |     |     |   |     |     |     |     |   |     |     |     |     |   |   |
| 08 | N   | E   | X   | T   |   | C   | H   | A   | R   | A | C   | T   | E   | R   |   |   |
| 09 |     |     |     |     |   |     |     |     |     |   |     |     |     |     |   |   |
| 0A |     |     |     |     |   |     |     |     |     |   |     |     |     |     |   |   |
| 0B |     |     |     |     |   |     |     |     |     |   |     |     |     |     |   |   |
| etc.|    |     |     |     |   |     |     |     |     |   |     |     |     |     |   |   |

FONT FORMAT ___4___

ORIENTATION ___Landscape___

CPI ___13.3___

CELL SIZE ___28___ WIDE, ___18___ HIGH

Numbers refer to sweeps, Blank boxes are unused byte-locations. Underlined boxes contain 6 significant bits of data.

Notes:
1. Cycle sequence: ___8/8/6/6___
2. Addressing sequence: ___∅-5-A___
3. Format 7 rotated

FIG. 13

STORAGE ORGANIZATION
CHARACTER GENERATOR ROM

|     | 0   | 1   | 2   | 3   | 4   | 5   | 6   | 7   | 8   | 9   | A   | B   | C   | D   | E   | F   |
|-----|-----|-----|-----|-----|-----|-----|-----|-----|-----|-----|-----|-----|-----|-----|-----|-----|
| 00  | 1A  | 1B  | 1C  | 1D  | 2A  | 2B  | 2C  | 2D  | 3A  | 3B  | 3C  | 3D  | 4A  | 4B  | 4C  | 4D  |
| 01  | 5A  | 5B  | 5C  | 5D  | 6A  | 6B  | 6C  | 6D  | 7A  | 7B  | 7C  | 7D  | 8A  | 8B  | 8C  | 8D  |
| 02  | 9A  | 9B  | 9C  | 9D  | 10A | 10B | 10C | 10D | 11A | 11B | 11C | 11D | 12A | 12B | 12C | 12D |
| 03  | 13A | 13B | 13C | 13D | 14A | 14B | 14C | 14D | 15A | 15B | 15C | 15D | 16A | 16B | 16C | 16D |
| 04  | 17A | 17B | 17C | 17D | 18A | 18B | 18C | 18D | 19A | 19B | 19C | 19D | 20A | 20B | 20C | 20D |
| 05  | 21A | 21B | 21C | 21D | 22A | 22B | 22C | 22D | 23A | 23B | 23C | 23D | 24A | 24B | 24C | 24D |
| 06  | 25A | 25B | 25C | 25D | 26A | 26B | 26C | 26D | 27A | 27B | 27C | 27D | 28A | 28B | 28C | 28D |
| 07  | 29A | 29B | 29C | 29D | 30A | 30B | 30C | 30D | 31A | 31B | 31C | 31D | 32A | 32B | 32C | 32D |
| 08  | N   | E   | X   | T   |     | C   | H   | A   | R   | A   | C   | T   | E   | R   |     |     |
| 09  |     |     |     |     |     |     |     |     |     |     |     |     |     |     |     |     |
| 0A  |     |     |     |     |     |     |     |     |     |     |     |     |     |     |     |     |
| 0B  |     |     |     |     |     |     |     |     |     |     |     |     |     |     |     |     |
| etc.|     |     |     |     |     |     |     |     |     |     |     |     |     |     |     |     |

Numbers refer to sweeps, Blank boxes are unused byte-locations. Underlined boxes contain 6 significant bits of data.

FONT FORMAT ___3G___

ORIENTATION ___Portrait___

CPI ___PS___

CELL SIZE ___32___ WIDE, ___40___ HIGH

Notes:
1. Cycle sequence: ___8/8/8/8___
2. Addressing sequence: ___0-4-8-C___
3. Characters are    % @ M W .m DEL and specials
4. Sweeps 33-40 occur, but data bytes are jammed to zero. Characters in this format cannot descend below sweep 32.

FIG. 14

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B | 1C | 1D | 1E | 2A | 2B | 2C | 2D | 2E | 3A | 3B | 3C | 3D | 3E | |
| 01 | 4A | 4B | 4C | 4D | 4E | 5A | 5B | 5C | 5D | 5E | 6A | 6B | 6C | 6D | 6E | |
| 02 | 7A | 7B | 7C | 7D | 7E | 8A | 8B | 8C | 8D | 8E | 9A | 9B | 9C | 9D | 9E | |
| 03 | 10A | 10B | 10C | 10D | 10E | 11A | 11B | 11C | 11D | 11E | 12A | 12B | 12C | 12D | 12E | |
| 04 | 13A | 13B | 13C | 13D | 13E | 14A | 14B | 14C | 14D | 14E | 15A | 15B | 15C | 15D | 15E | |
| 05 | 16A | 16B | 16C | 16D | 16E | 17A | 17B | 17C | 17D | 17E | 18A | 18B | 18C | 18D | 18E | |
| 06 | 19A | 19B | 19C | 19D | 19E | 20A | 20B | 20C | 20D | 20E | | | | | | |
| 07 | | | | | | | | | | | | | | | | |
| 08 | N | E | X | T | | C | H | A | R | A | C | T | E | R | | |
| 09 | | | | | | | | | | | | | | | | |
| 0A | | | | | | | | | | | | | | | | |
| 0B | | | | | | | | | | | | | | | | |
| etc. | | | | | | | | | | | | | | | | |

Numbers refer to sweeps, Blank boxes are unused byte-locations. Underlined boxes contain 6 significant bits of data.

FONT FORMAT ___5___

ORIENTATION __Landscape__

CPI ___12___

CELL SIZE ___40___ WIDE, ___20___ HIGH

Notes:
1. Cycle sequence: ___8/8/8/8/8___
2. Addressing sequence: ___0-5-A___
3. Format 1 rotated.

FIG. 15

STORAGE ORGANIZATION
CHARACTER GENERATOR ROM

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 00 | 1A | 1B | 1C | 1D | 1E | 2A | 2B | 2C | 2D | 2E | 3A | 3B | 3C | 3D | 3E | |
| 01 | 4A | 4B | 4C | 4D | 4E | 5A | 5B | 5C | 5D | 5E | 6A | 6B | 6C | 6D | 6E | |
| 02 | 7A | 7B | 7C | 7D | 7E | 8A | 8B | 8C | 8D | 8E | 9A | 9B | 9C | 9D | 9E | |
| 03 | 10A | 10B | 10C | 10D | 10E | 11A | 11B | 11C | 11D | 11E | 12A | 12B | 12C | 12D | 12E | |
| 04 | 13A | 13B | 13C | 13D | 13E | 14A | 14B | 14C | 14D | 14E | 15A | 15B | 15C | 15D | 15E | |
| 05 | 16A | 16B | 16C | 16D | 16E | 17A | 17B | 17C | 17D | 17E | 18A | 18B | 18C | 18D | 18E | |
| 06 | 19A | 19B | 19C | 19D | 19E | 20A | 20B | 20C | 20D | 20E | 21A | 21B | 21C | 21D | 21E | |
| 07 | 22A | 22B | 22C | 22D | 22E | 23A | 23B | 23C | 23D | 23E | 24A | 24B | 24C | 24D | 24E | |
| 08 | N | E | X | T | | C | H | A | R | A | C | T | E | R | | |
| 09 | | | | | | | | | | | | | | | | |
| 0A | | | | | | | | | | | | | | | | |
| 0B | | | | | | | | | | | | | | | | |
| etc.| | | | | | | | | | | | | | | | |

Numbers refer to sweeps, Blank boxes are unused byte-locations. Underlined boxes contain 6 significant bits of data.

FONT FORMAT ___6___

ORIENTATION ___Landscape___

CPI ___10___

CELL SIZE ___40___ WIDE, ___24___ HIGH

Notes:
1. Cycle sequence: ___8/8/8/8/8___
2. Addressing sequence: ___0-5-A___
3. Format 2 rotated.

FIG. 16

METHOD AND APPARATUS FOR STORAGE AND ACCESSING OF CHARACTERS, AND ELECTRONIC PRINTER EMPLOYING SAME

BACKGROUND OF THE INVENTION

The present invention relates to method and apparatus for the storage, accessing and processing of character-representing information, and especially to an improved data storage, accessing and processing system for storing in a memory bits of character-representing information and for accessing them when it is desired to use such information to control a character-forming device, e.g. a cathode-ray tube or laser.

The invention, in the interest of definiteness, will be described with particular reference to its use in an electronic printer of the type shown and described in co-pending U.S. patent application Ser. No. 307,499 of J. M. Beisty et al, entitled Electrostatic Printer Drum Improvements, and filed Oct. 1, 1981, now U.S. Pat. No. 4,400,083, issued Aug. 23, 1983. This printer is of a type in which successive lines or "slices" through the characters to be printed are displayed one at a time upon the screen of a cathode-ray tube, and a drum carrying an electrostatically-charged light-sensitive sheet or web is rotated past the cathode-ray tube screen so that latent images of the line scans on the cathode-ray tube are successively formed adjacent and partially overlapping each other on the light-sensitive sheet to represent successive slices through the characters to be printed. As further described in the above-cited copending application, a suitable toner is applied to the light-sensitive sheet after it rotates past the cathode-ray tube screen, in such manner that the toner remains on the sheet only in the areas of the latent image. As the drum rotates further, the toner, which now depicts the desired characters, is transferred from the sheet to the printing paper to accomplish the final printing on the paper as the paper is moved past the rotating drum. Subsequently in its rotation, the sheet is cleaned of toner and electrostatically recharged to reinitiate the cycle. The present invention is concerned primarily with the electronic system used in such apparatus to form the successive linear slices of the characters upon the CRT screen, in response to stored binary digital information as to what it is desired to print.

In such systems, each slice through a character is represented by a group of data bits representative of the appropriate successive intensities of the cathode-ray tube (CRT) beam as it sweeps across the CRT screen in the area in which the character is to appear. For convenience and economy, these data bits are normally accessed and processed in bytes each made up of a predetermined number of data bits. For example, if 24 bits are used to represent each character slice, they may be grouped for processing into three 8-bit bytes, 8 bits being the usual byte size in digital data processing circuits.

In a rudimentary electronic printer, all characters may be allotted the same width and height of character space to accommodate the character and its spacing from adjacent character spaces. In such case the number of bits per character slice, i.e. the bit-width of the character space, will be constant, and can be selected to comprise an integral number of 8-bit bytes for all characters. However, such a printer is so lacking in versatility and sophistication as to be of little interest for many commercial purposes. A basic problem with such an arrangement is that if one allots a single uniform character space to all characters, such character space must be large enough to accommodate the maximum character size and spacing; in this event, the character space will be too great for other character sizes and spacings which one desires to use.

For example, one may want to provide for the printing of the same alphanumeric characters in different styles and sizes, and with different spacings between them; if the same size of character space is used for all characters, the inter-character space will be too small for large characters and/or too large for small characters. Similarly, even within a font of characters having the same style, it is often desirable to provide proportional spacing, i.e. to provide a lesser cell width for narrow characters, such as the apostrophe, than for a wide character, such as an M.

Furthermore, in general, the width of the character space allotted to a given character may differ from the height of character space allotted to that character, and yet it may be desirable at different times to print the character either in its normal erect position or in what amounts to a position in which it lies on its side. This arises from the desirability of being able to print the material in one case so it reads along the narrow dimension of a page and in another case so it reads along the long dimension, without having to turn the printing paper between positions at right angles to each other. In the system to be described, when the page is to have the lines of print readable across the width of the paper, the line scanning which forms the slices of the characters is along the direction in which one reads the characters; however, when the printing is to be oriented at right angles, so that it is read along the length of the page, the line scans and slices are at right angles to the direction of visual reading of the characters, that is, the line scans are in effect still along the width dimension of the paper even though the reading sequence of the characters is along the length dimension of the paper. Since the character spaces are in general not square, the number of bits in a character slice will be different depending on whether scanning is along, or at right angles to, the direction of normal reading of the rows of characters.

The foregoing are merely examples of situations in which it is desirable for the widths of the individual character cells along the direction of the character slice to differ among themselves, so that the number of bits of information scanned, per single slice through a character in storage, generally differs correspondingly. However, it has been found that when character slices of differing bit widths are used, the dividing of the bit information per slice into bytes of uniform bit number, e.g. 8 bits, results in substantial drawbacks, particularly in terms of the expense and complications of the equipment needed to do so. This is because, in general, the number of bits per character slice is not always an even number of bytes, i.e. the number of bits is not an integral multiple of 8. As a result, in a conventionally organized memory and access system storing the slice information in 8-bit bytes, there could be as few as 1 or as many as 7 extra bits left over after the bits representing a slice have been divided into an integral number of bytes. With such an arrangement, the equipment must accommodate not only the handling of an integral number of 8-bit bytes, but will also have to handle the extra bits, for example 2 bits, 4 bits or 6 bits left over after an integral number of 8-bit bytes have been stored, complicating the equipment substantially. Furthermore, where the number of extra bits is low, e.g. 2 bits, successive accesses and read-outs must be had from the character storage memory within the time of a very few bits, and while in general this is theoretically possible to accomplish, it requires considerably more expensive equipment than if, for example, the minimum time for access and read-out were larger, e.g. 6 bit-times, or at least 4 bit-times.

Accordingly, it is an object of the invention to provide a new and useful method and apparatus for the storage and accessing of character-representing information.

Another object is to provide such method and apparatus which overcomes or mitigates the drawbacks inherent in storing, accessing and processing information in the form of bytes containing a uniform number of significant bits plus, in some cases, a small number of extra bits.

It is also an object of the invention to provide such method and apparatus which overcomes or mitigates the drawbacks associated with the storage, accessing and processing of bit information in bytes of constant significant bit content plus extra bits in varying numbers.

A further object is to provide a new and useful electronic printer employing a new character-slice system, and a new accessing and processing system for use therewith.

SUMMARY OF THE INVENTION

In accordance with the invention these objects are attained by the provision of a method and apparatus in which bit information as to characters to be displayed is stored, accessed and processed in the form of an integral number of bytes containing two different numbers x and y of significant bits, and such stored information is accessed and read out in the form of an integral number of such bytes.

Preferably the numbers of significant bits per byte differ by 2, i.e. $x=y+2$, and in the preferred embodiment x is 8 and y is 6. With this latter system, for example, characters having bit-widths in the scanning direction of 6, 8, or any even number of bits greater than 10 can be used. It has been found that the number of bits per character slice permitted by this arrangement constitute sets which accommodate a usefully wide range of characters and character spacings, while reducing the complexity and cost of the equipment required for reliable operation, because all information is completely stored in only two types of bytes and it is therefore not necessary to process data in the form of different numbers of extra bits left over after the completion of an integral number of 6- or 8-bit bytes, and because it is not necessary to accomplish accessing of the data storage apparatus in a time less than the time of 6 bits as would be necessary if a number of extra or left-over bits less than 6 had to be accommodated.

For purposes of clarity, and in order to simplify the description of the present invention, the term "6-bit byte" will be used to designate a byte having 6 significant bits. It should be understood, however, that a "6-bit byte" may be stored in a full sized byte-location (consisting of 8 bit-locations); in such case only 6 of the 8 bits are significant, the remaining 2 being unused. Similarly, the term "8-bit byte" will be used to indicate a byte containing 8 significant bits.

While the above-described use of combinations of 6-bit and 8-bit bytes is preferred and has been found especially advantageous, it is possible to obtain some of the advantages of the invention using bytes of different significant-bit content. More particularly, each set of bytes which represents a slice through any character may be organized according to the formula $N(x)+M(y)$, where $N(x)$ represents an integral number N of x-bit bytes, $M(y)$ represents an integral number M of y-bit bytes, x is different than y, either N or M but not both may be zero for any particular character, and the totality of said sets of bytes contains both x-bit and y-bit bytes. Preferably at least some of the individual sets of bytes representing a single character slice contain both x-bit bytes and y-bit bytes, and preferably x differs from y by 2. It will be appreciated that the previously-described preferred embodiment is for the special case in which $x=8$, $y=6$, an embodiment which is particularly advantageous for the reasons set forth in detail hereinafter.

A preferred embodiment of the invention also includes the following further features, although at least some of the advantages of the invention may be realized without necessarily using all or any of such additional features.

The storage of 8- and 6-bit bytes representing character-slices is such that all bytes for a given character are in the same storage area of the memory, with the bytes for each slice located at consecutive addresses, with no bytes of other character slices interleaved with them, and the order of the addresses for the bytes for each character slice is the same order as that in which the bytes are to be serially read out. This permits accessing each character slice by merely addressing the first byte and then automatically incrementing that address the number of times required to access the remaining bytes for that character slice.

Also, the bytes for the character slices for each character are preferably stored at addresses specifiable in terms of a column address and a row address, and the address sequence in which the bytes of any given character are stored is the same for each row of the matrix. Accordingly, for any given character the first bytes of the character slices are located at the same set of column addresses, and the address for the first byte of each character slice is defined by the sweep number and the particular sequence of first bytes characteristic of that character. The coordinate matrix address of any byte can therefore be derived by generating a sweep count signal and a signal representing the sequence for that character, and translating this information to a matrix coordinate address.

Also, the number of different sequences used for the various characters is preferably small compared with the number of characters, e.g. three sequences may be used for over a thousand different characters. This simplifies the above-described addressing, since for example, only two bits are needed to identify which of these sequences is used.

Further, the accessing of the 8- and 6-bit bytes is preferably accomplished by means of a timing pulse generator which is controlled to generate either 8 or 6 timing pulses per byte cycle, and the timing pulses are used to access and read out the 8- and 6-bit bytes serially with the significant bits of one byte immediately following those of the previous byte in a continuous bit stream, without gaps between bits, as is desired to control the character-forming device during each sweep. Whether an 8- or 6-bit cycle is performed is controlled by storing information as to the number of 8- and 6-bit bytes used for each character, and reading this information out to a logic circuit in response to each received character-representing signal. The logic circuit then controls which cycle is performed by the timing pulse generator; it also controls the number of times the byte address is incremented to read out the desired character-slice bytes from memory, and arrests the incrementing when read-out of that slice is completed, preparatory to read-out of the next character slice; it also controls the time at which serial read-out of the bits to the image-forming device begins for each complete character slice, to produce the desired continuous uninterrupted bit stream during each sweep.

Other preferred features are described hereinafter in detail.

BRIEF DESCRIPTION OF FIGURES

These and other objects and features of the invention will be more readily understood from a consideration of the following detailed description, taken in connection with the accompanying drawings, in which:

FIG. 2 is a schematic front view of the screen of the cathode-ray tube used in the printer of FIG. 1 to display successive slices through a row of characters to be displayed, such as the characters shown in FIG. 3;

FIG. 3 is a diagram illustrating part of a row of characters to be printed;

FIG. 4 is a diagram showing the three characters of FIG. 3, enlarged and with various grid lines superimposed on them;

FIGS. 6-16 show the organization of characterslice bytes in the character-storage locations for 11 different formats of character storage, in accordance with a preferred form of the invention;

DETAILED DESCRIPTION OF SPECIFIC EMBODIMENTS

Figure 1:
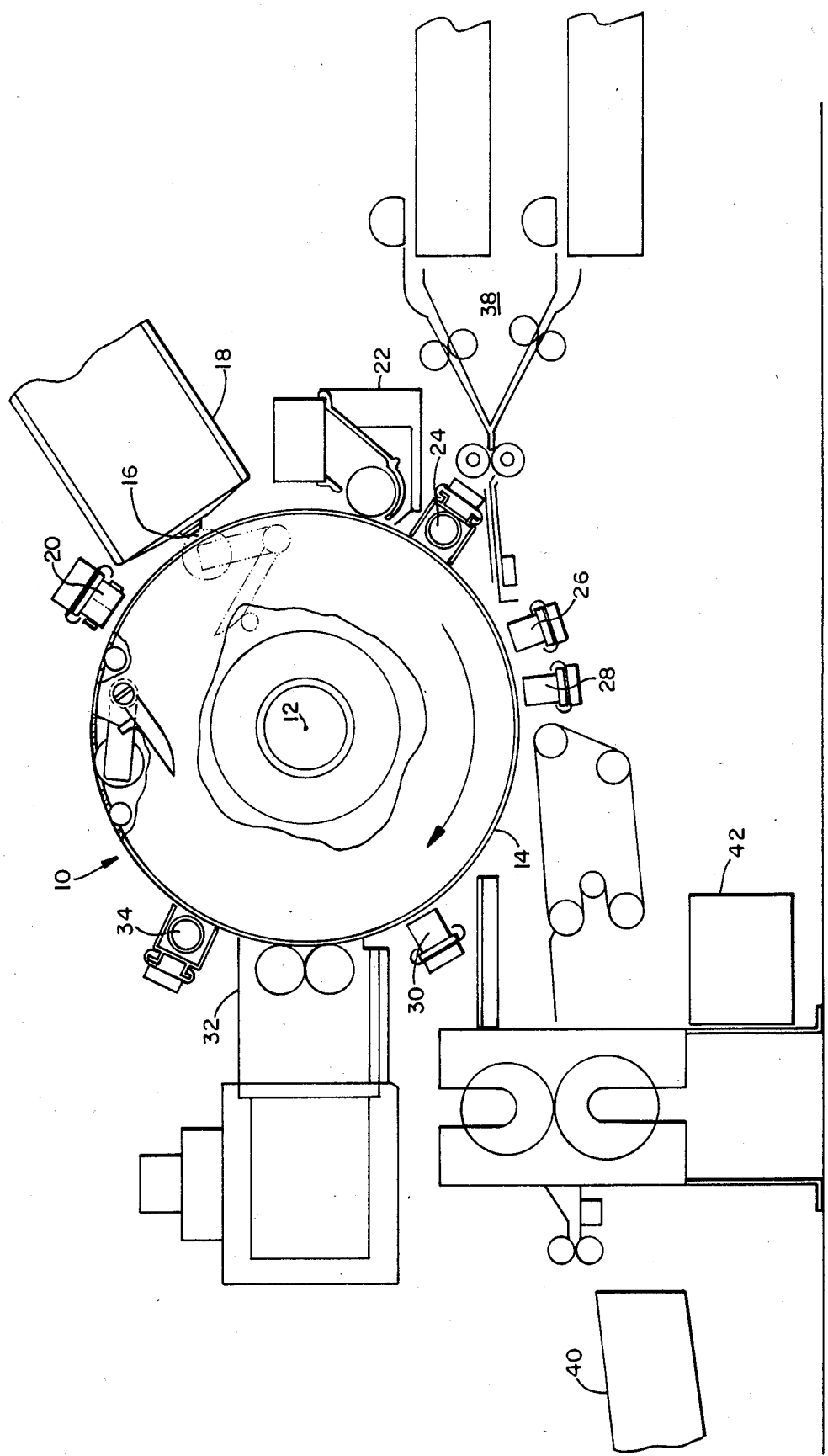
FIG. 1 is a schematic side-view of an electronic printer of a type to which the invention is applicable and in connection with which the invention will be described in detail.

Referring now to the embodiments of the invention shown in the drawings for purposes of definiteness only, and not in any way thereby restricting the scope of the invention, FIG. 1 illustrates schematically an electronic printer to which the present invention is applicable, and in which the invention is especially advantageous. The printer is not shown or described in detail herein, since it is disclosed more fully in the above cited copending application Ser. No. 307 499, now U.S. Pat. No. 4,400,083, issued Aug. 23, 1983. In this printer, a drum 10 is rotated about a horizontal axis 12, and carries on its periphery a cylindrical sheet 14 of light-sensitive and electrostatically chargeable material suitable for electrostatic transfer of a toned optical image to plain paper. In this example, a light-image to be projected onto the exterior of the optically sensitive sheet is formed electronically on the screen 16 of a cathode-ray tube (CRT) 18. The drum 10 rotates in the direction of the arrows, first past a corona discharge device 20 for electrostatically charging the sheet 14, then past the CRT screen so that an electrostatic image of the CRT display is formed on the sheet, and next past a toner applicator stage 22 at which a toner is applied to the exterior of the sheet. Thereafter the drum rotates in succession past an array of lamps 24, a transfer corona device 26, a detack corona device 28, a preclean-up corona device 30, a clean-up station 32, and a burn-out lamp 34. The cleaned sheet is then again electronically charged by the corona discharge device 20 to ready it for another cycle of operation. In a course of this rotation of the drum, the image formed on the face of the CRT is directed onto the surface of the optically sensitive sheet and, as described in the above-identified copending application, the toner assumes the same configuration on the sheet as the darkened portion of the image which has been projected onto the sheet by the CRT; when the sheet carrying the toner image is pressed against the charged printing paper at a position near the bottom of the drum, it transfers the toner image to the paper, which is automatically fed from the paper source 38 past the underside of the drum to the paper output tray 40.

The optical information displayed on the screen of the cathode-ray tube is generated on a line-by-line basis; that is, the cathode-ray beam is scanned in a straight line across the face of the tube while its intensity is controlled in response to stored bits representing the darkness or lightness of a particular narrow slice through a row of the characters to be printed, as illustrated in FIG. 2, wherein the line A-A' represents the position of the CRT sweep and the horizontal solid-line segments along that line represent dark areas corresponding to the character slices being displayed. The latter slices correspond to those along A-A' in FIG. 3. During its retrace, the beam is "blanked" and returned to its initial position, and it is then swept again along the same path on the CRT screen. The persistence of the CRT screen phosphor is preferably sufficiently short that by the time the beam begins its next sweep the information displayed in the previous scan has substantially completely decayed, to leave a substantially clean slate for the subsequent sweep.

During the next beam sweep, the image displayed on the CRT face is that corresponding to the next lower slice through the same row of characters to be printed, illustrated in FIG. 3 by line B-B', wherein the spacing between lines A-A' and B-B' has been greatly exaggerated for clarity. The speed of rotation of the drum 10 and the sweep repetition rate of the CRT are preferably synchronized so that the beam sweeps, as projected onto the light-sensitive sheet 14, overlap to some extent along the vertical direction. In this way the latent image of a complete page of the desired printing is formed, slice-by-slice, on the optically sensitive sheet for transferring to the printing paper.

The present invention is primarily concerned with the electronic system for forming the desired radiant optical image of the successive slices of the characters to be printed, along successive sweep lines on the cathoderay tube screen. The majority of the electronic elements of such system may suitably be housed in cabinetry 42 of FIG. 1 on the same frame which supports the mechanical portions of the printer, and a suitable operator's console (not shown in FIG. 1) for inserting control signals into the electronic system may also be mounted to the same supporting frame, or adjacent thereto.

Referring to FIG. 4, which shows enlarged the first three characters in FIG. 3, it will be seen that the row of characters may be considered as defined by a plurality of adjacent, vertically-displaced slices at positions such as those numbered 1–40. The basic purpose of the apparatus to be described in detail is to receive digital information as to the characters to be displayed on the CRT, and to control appropriately the intensity of the cathode-ray beam during each of said successive CRT sweeps so that its intensity will represent the appropriate brightness or darkness along the corresponding successive slices through the row of characters. Thus, by way of example, a slice such as slice A-A' (slice #14) of the character row partially depicted in FIG. 4 will be displayed on one sweep of the CRT as shown in FIG. 2, after which the next character-row slice (#15) will be displayed, etc. The overall organization is such that each character-row slice is formed by storing bit information as to the character slices in the row, and accessing the appropriate character slices in immediately-successive order to form the character-row slice.

The application of the invention next to be described is for an electronic printer in which it is desired to be able to print characters on a sheet with the characters readable along the smaller dimension of the paper, and in most instances with each character selected from any desired font including fonts containing different styles of print and fonts which provide proportional spacing of the characters in a row. It will also print characters readable along the larger dimension of the paper, without rotating the paper; however, in the latter mode it will not switch font format between successive characters, and hence will not print with proportional spacing, although it can change font format between successive pages.

Figure 5:
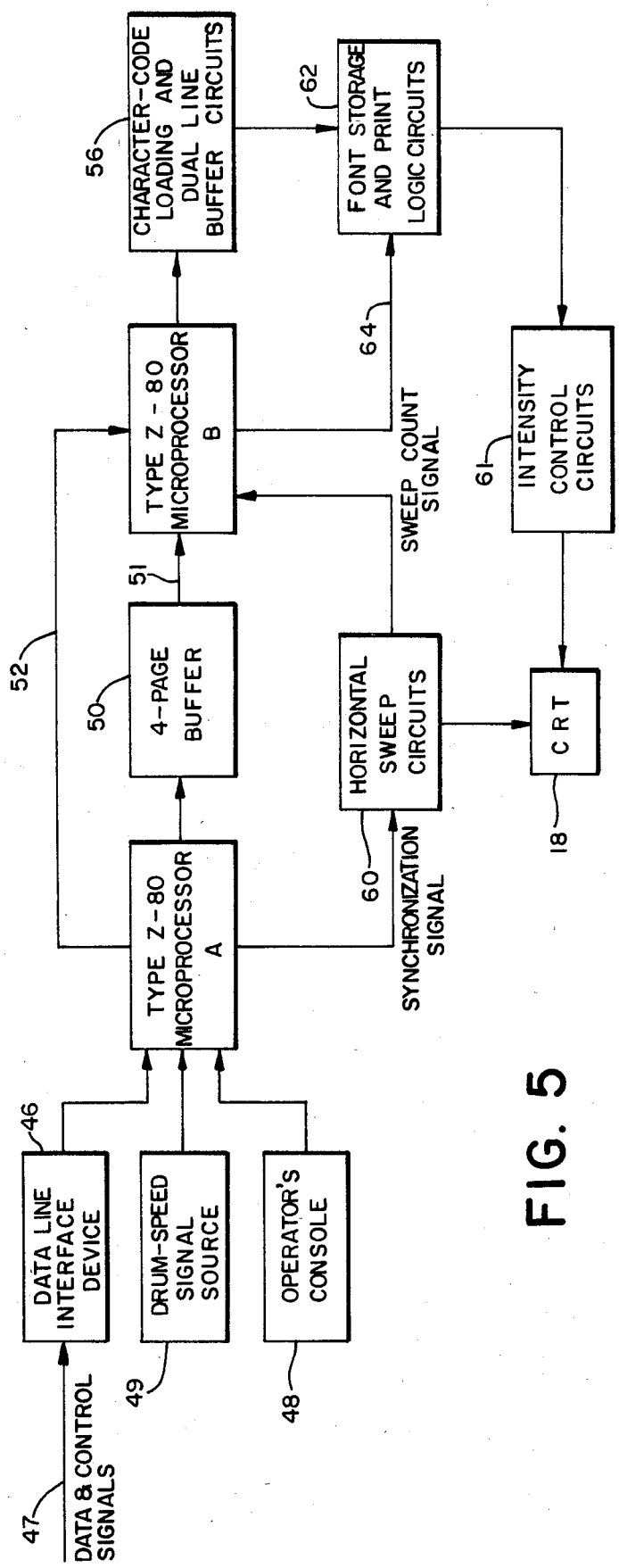
FIG. 5 is a generalized block diagram of the electronic portion of the printer.

FIG. 5 illustrates the preferred overall organization of the electronic system. Digital information representing the characters to be printed and associated control data may be supplied to the system by means of a data line interface device 46 receiving digital data and control signals from a suitable input line 47; a suitable operator's console 48 may also input various forms of control signals. Also shown in block form is a drumspeed signal source 49 which supplies information to microprocessor A as to the speed of rotation of the printer drum 10, so as to permit appropriate synchronization between the position of the optically sensitive sheet on the drum and the times of occurrence of the successive line scans on the screen of the CRT 18.

The system preferably employs two microprocessors, A and B, each of which may be Type Z80 microprocessors commercially available on the open market. Microprocessor A receives, controls and formats character-representing digital data and associated control data received from the data-line interface device 46 or from the operator's console 48. Microprocessor A contains its own ROM to facilitate its control and formatting functions. It is capable of receiving and storing binary digital information representing large numbers of pages of information to be printed, along with special instructions such as margin spacing, character font, etc.

It will be understood that while reference is made throughout to the printing of characters, the so-called "character" need not be an alpha-numeric character or punctuation, but can be any unit of information to be printed, for example straight or curved lines, dots, or solid blocks of information from which diagrams, graphs or the like may be constituted.

A four-page buffer 50 is provided which is capable of receiving from microprocessor A, and storing, information and instructions for four pages of material to be printed, along with other print instructions and character-addressing and control data from microprocessor A.

A second microprocessor B is also employed, which may again be a Type Z80 microprocessor, and is supplied over line 51 with the digital information stored in the four-page buffer, on a character-row by character-row basis, and also with timing and control signals from microprocessor A over line 52. Character-code loading and dual line-buffer circuits 56 serve to store, in two respective addressible registers contained therein, data representing two successive character rows, in such manner that data as to one character row is loaded into one register while data as to the previous character-row is being read out of the other line buffer and processed for delivery to the CRT.

The CRT 18 is provided with horizontal sweep circuits 60, which are synchronized by sync signals from microprocessor A, and are also connected to microprocessor B so that a counter in microprocessor B can keep count of the sweeps as they occur during scanning of each character row. Intensity control circuits 61 are also provided which control the intensity of the cathode-ray beam of CRT 18 during each horizontal sweep thereof in response to read-out character-slice information, so as to display on the CRT the desired slice through a character row.

The character-code loading and dual line-buffer circuits 56 supply their data in appropriate fashion to the font storage and print logic circuits 62, which are also supplied over line 64 with a sweep count signal from microprocessor B, and which function to provide the intensity control circuits 61 with serial bits of information during each horizontal sweep of the CRT so as to produce the desired line-display on the CRT. The present invention is primarily concerned with the structure of the font storage and print logic circuits which store and access character-representing information, and apply it appropriately to the intensity control circuits 61.

Character Storage Organization and Addressing Technique

The preferred general scheme according to which the subject system analyzes the characters to be printed into character-representing digital information is depicted in its essentials in FIG. 3, which shows fragments of a row of characters to be printed, and in FIG. 4 which is an enlarged view of three adjacent characters in that row. From FIG. 4 it should be apparent that if, as shown, an orthogonal grid of horizontal and vertical lines is pictured as superimposed on the characters to be printed, and if the grid is sufficiently fine, then if one merely controls the CRT beam appropriately to be completely on or off during each grid interval traversed during each line sweep, the resultant printing will provide a good likeness of the original characters. In the equipment here to be described, it will be assumed that the grid lines in each direction provide 240 grid intervals per inch. The horizontal lines correspond to the horizontal sweeps of the CRT, and the vertical lines correspond to those times and positions on the CRT screen at which the stored bit information lightens or darkens the CRT screen so as to display the desired character slices. In the present example, each character is represented within a rectangular cell which is 40 sweeps (slices) high and of variable width depending upon the character; as shown by way of example in FIG. 4, the capital J has a width of 20, the apostrophe a width of 8, and the small t a width of 16. Each grid space along each sweep corresponds to one bit of binary digital information, stored in a memory storage device and read out to the CRT to control its intensity during each sweep.

More particularly, data bits representing each character to be displayed are stored permanently in a character font storage containing one character location for each character, each such location comprising a number of information bits for each of the successive slices through a given character. Thus, as indicated in FIG. 4, for slice #14 of the character J, for example, there would be stored the bit information 00000000111000000000. For the apostrophe, the stored bits of information for character slice #14 would be 00111000. The totality of the stored bits for all slices of a character location constitutes one character location in a font, and a complete font typically consists of 128 characters.

The number of bits stored per character, as determined by the bit width and bit height of the cell, could be the same for all characters in all fonts. However, as previously mentioned, for most purposes it is highly desirable to provide a plurality of different fonts, which differ from each other with respect to the number of bits in the cells thereof, and additionally to provide for fonts in which individual characters have widths differing from each other; thus, the different fonts will in general store characters whose cells have different bit widths, and/or in some cases different bit heights.

For example, with 240 grid intervals per inch, if one wishes to present a horizontal row of characters at 10 characters per inch, the character cells may each be 24 bits wide, and if one wishes to present 6 rows of characters per inch, this requires use of cells which are 40 bits high. If the character information is stored in the font cells in conventional 8-bit bytes, there are 3 bytes per slice of each character and 40 slices, equaling a total of 120 bytes per character. A font providing for 16,284 8-bit bytes therefore readily accommodates 128 such 24-bit wide characters.

While it might be argued that 120 bytes per character are not really needed because when printing characters there are always some blank regions between successive character rows, this is not true for characters used to represent certain graphics such as continuous vertical lines or logos built up from character cells, as examples. Accordingly, in the present system the character cells are large enough to provide data corresponding to the complete area of the portion of the page on which printing is to be provided. This actually simplifies the logic and circuitry employed, because no special CRT sweeps are needed, every sweep being controlled as to intensity by stored bit information.

The 16K byte requirement for storage of a single font in this example is met by use of eight 2716 (2K) ROMS. In the particular system now to be described, three such fonts may be provided on each storage board, and provision is made for inclusion of five font storage boards, for a total of 15 fonts. Each slice of each different form of character is stored at a known location in a particular one of the fonts. In this example, the font storage is permanent, and cannot be changed without replacing the ROM's.

If the character cells of the characters stored in the fonts were all of the same bit width, e.g. 24 bits wide, and the bit width were uniformly an integral multiple of the byte size, e.g. 8 bits per byte, the manner of storage of characters in the fonts and their manner of access and processing would be comparatively simple. However, as pointed out above, in general the fonts will contain character storage cells of different bit widths. For example, different fonts may contain different sizes of type, in which case the smaller characters would normally have a smaller inter-character spacing and hence use a narrower character cell. Also, as shown in FIG. 4 different types of characters will generally benefit from having different character cell widths; for example, an apostrophe should have a narrower cell (e.g. 8 bits) than a capital J (e.g. 20 bits). The latter consideration has to do with so-called proportional spacing, in which the space allotted to a given character is narrower, the narrower the character. Also, as mentioned previously, if the characters are to be printed with the character rows extending along the narrow dimension of the page, i.e. in the portrait orientation, the cells will normally have a given height and a differing width; if the characters are to be printed so as to be read along the long dimension of the paper, i.e. in the landscape orientation, the cells will be scanned along their longer dimension, and this will correspond to, in effect, a greater character-cell width.

Table I indicates under the heading "Format No." an arbitrary numerical designation of different representative types of character formats in various fonts; under the heading "Orientation", an indication of whether the printing is to be in the portrait or landscape mode; under the heading "CPI", the numbers of characters per inch in the row of characters (PS represents proportional spacing), wherein the CPI varies depending on the size of the character; under the heading "LPI", the number of rows of characters per inch; under the heading "Cell Bits Wide × High", the bit width and bit height for each cell; and the remaining column contains comments. Formats 3A through 3G are all part of one font, which as indicated contains seven different widths of cells to accomplish the desired proportional spacing.

Table II hereof groups the formats of Table I according to the number of bit widths of the character cells, and also shows the number of extra or left over bits which would be employed in a prior-art system using 8 bits per byte. With such an arrangement of the storage of bits in the font storage, it will be seen that there are three possible bit arrangements, namely, an integral number of 8-bit bytes, an integral number of 8-bit bytes plus a 2-bit adjustment, and an integral number of 8-bit bytes plus a 4-bit adjustment; in other forms of the system, the character cell format may also require, for instance, a 6-bit adjustment. Thus, the accessing and processing equipment in such a system would have to accommodate up to four different types of bit organizations. While this is possible, the logic required to do so would be quite complex and expensive.

Further, in those formats such as No. 7 where there are 2 extra bits, and even in Formats 1, 3B, 3D, 3F and 4 where there are 4 extra bits, successive accessing of the font storage would be required at very short time intervals (e.g. in 2 bit-times or in 4 bit-times), and while this is possible the time between successive accesses is then so short that relatively complex and expensive equipment would be necessary to accomplish this.

In accordance with the invention, it has been recognized that, except for the number 10, all even numbers equal to or greater than 6 can be expressed as 6N+8M, wherein N and M are integers, and that all of the bit widths of Table II as well as other widths not shown in Table II can therefore be arranged in the form of N 6-bit bytes+M 8-bit bytes, with no left-over or extra bits. With this organization, only two combinations of bit groups, namely 6 and 8-bit bytes, are used, and it is easier and less expensive to provide for only these two corresponding control cycles, instead of 3 or 4. Furthermore, the minimum time between successive accessings of the bits is 6 bit-times, rather than 2 bit-times, and hence the equipment can be made simpler and less expensive than if accesses at 2 or 4 bit-time intervals were required.

In the present form of the equipment, the 8-bit cycles always precede the 6-bit cycles in the storage and handling of the data, and Table III hereof shows the various 8-bit and 6-bit cycle sequences which may be employed for different bit widths of the character storage cells, along with comments indicating those cycle sequences which are used with the formats listed in Table I. Since in this example of the invention the required bit widths are all even numbers equal to 8 or more and excluding 10, all of the desired bit widths are covered by the various combinations of 8 and 6-bit cycles. It is noted that odd numbers of bits are not provided for; however, the apparent requirement for use of even numbers of bit widths is not unduly restrictive on other forms of the invention, particularly when it is recognized that with the high bit densities utilized there is no substantial drawback in utilizing the nearest even bit width, instead of an odd bit width differing by only one bit, for a cell which ideally might have an odd bit width.

It is noted that some of the bit widths could be represented by different combinations of 8 and 6-bit bytes than are listed under the heading Cycle Sequence in Table III. For example, the sequence 8/8/8 could be represented by the cycle 6/6/6/6, and the cycle 8/8/8/8 could be represented by the cycle 8/6/6/6/6/. In such cases, for the present purposes it is preferred to utilize the cycle sequence which utilizes the largest possible number of 8-bit bytes, because, in general, this minimizes the number of cycles needed to complete a character bit slice, and makes most efficient use of the allocated font storage area.

Accordingly, in the present embodiment the bits contained in each slice through each character are stored in a prescribed 8-bit, 6-bit sequence in the font storage memory, in known addressable locations. To access any particular slice for a particular character, the addressing logic is provided with addressing information which, with respect to each character, specifies the font, the ROM of the font in which the character slice information is stored, the allocated area in the ROM which contains the bits of the character, and the location of the slice within the character storage area. In order for the processing equipment to operate properly, information should also be provided to the processing circuitry as to the number of 8-bit and 6-bit cycles applicable to slices of each of the various characters. To produce the necessary cycle information a special ROM is provided for each font, which contains, for each character, information as to the character width and the appropriate cycle sequence for that character, which information is automatically read out and utilized as described later herein.

The character slice bits are organized in the font memory as follows. The successive bytes for each slice of a character are located at immediately consecutive addresses, and the successive slices for that same character are preferably located at successive, but not necessarily immediately successive, addresses, and in one of several specific sequences as will now be described.

FIGS. 6 through 16 illustrate preferred byte address positions for the characters stored in the font storage devices, for the various font formats listed above. As seen from Table II, there are 11 different formats of storage organization in this example. FIG. 6 shows the character-slice storage organization for font format 3A, which presents the simple case of an 8-bit wide character cell, used for the apostrophe. In this and in the other storage organization charts, the numbers within the matrix represent the number of the sweep or character slice, the blank boxes or locations are unused, and the boxes containing any underlined numerals contain 6-bit bytes (6 significant bits per byte), the remainder being 8-bit bytes. In each of FIGS. 6–16, one coordinate of the byte matrix address extends along the top of the matrix and the other is shown extending downwardly along the left edge of the matrix. As mentioned above, it will be seen that the bytes representing any slice of a character have consecutively ordered addresses, and 128 consecutive byte locations are allocated to each character. The storage organizations shown in FIGS. 6 through 16 are those for font formats 3A; 3B; 3C; 7; 1 and 3D; 2 and 3E; 3F; 4; 3G; 5; and 6, respectively.

More particularly, FIG. 10 shows, for example, the storage organization for font formats 1 and 3D, and illustrates that, on the first sweep, bytes 1A, 1B and 1C are sequentially addressed and have respective bit widths of 8, 6 and 6, and that this cycle is repeated successively for successive sweeps (for example, 2A, 2B, 2C are the character-slice bytes for sweep 2; 3A, 3B and 3C are the character-slice bytes for sweep 3, etc. ), with the bytes for the different slices being located at the coordinate positions shown. This is the format which is used for the character J of FIG. 4. The character format for the character t in FIG. 4 is the 3C format of FIG. 8, for characters having 16-bit slices.

Comparing FIGS. 6–16 with each other, it is noted that, within each format, the bytes are arranged according to a predetermined column address sequence or pattern, such that the first bytes of the sets of bytes corresponding to the different sweeps are located at only a few predetermined horizontal locations in the matrix, rather than randomly. More particularly, the first bytes for each sweep are positioned according to the following address sequences:

In the matrix columns headed ∅,5 and A for the three landscape formats

In the matrix columns headed ∅,4,8 and C for Formats 3F, 3G and 7

In the matrix columns headed ∅,3,6,9 and C for all other formats.

As will be seen, this enables considerable simplification in developing the addressing signals for accessing the character slices in the storage fonts. Basically, the stored character-slice information is first addressed to read out the first byte of a given character slice, and the column address is thereafter incremented successively by 1, in response to signals from timing control apparatus, to step the address through the number of sequential byte locations which that character format requires. The location at which the first byte of a given slice occurs differs depending upon the sweep to which it corresponds. However, as is apparent from the above sequence tabulation and the format charts, if the sweep number and the addressing sequence for the particular character are specified, the location of the first byte for a given character-slice is also thereby specified. Since for all the characters and all of the formats there are only three different sequences, the sequence appropriate for any given character can be identified by two bits of addressing information which, as will be described in detail hereinafter, are concatenated with the sweep count bits to contribute to the generation of a compact addressing code.

In general then, from the incoming data representing the font to be used, the character to be displayed and the sweep count, addressing bits are generated which specify the board, font and ROM in which the desired character-slice is located, and the matrix address of the first byte of that character-slice in the accessed ROM. As will be described in detail, a special character-structure ROM is also provided for each font storage device which, when addressed by the character code, provides the above-described necessary sequence-information bits for completing the address, as well as bits indicating how many 8-bit and 6-bit bytes are contained in the slice to be accessed, to control the timing control apparatus of the system so as to produce the necessary 8-bit and 6-bit timing cycles and the proper number of address increments for the number of bytes in the slice. Once accessing of a particular byte is called for, the byte is loaded in parallel into a parallel-to-serial shifter for serial supply to the intensity-control circuits of the CRT during the time when the next byte is being accessed.

General Arrangement of Font Storage and Print Logic Circuits

Figure 17:
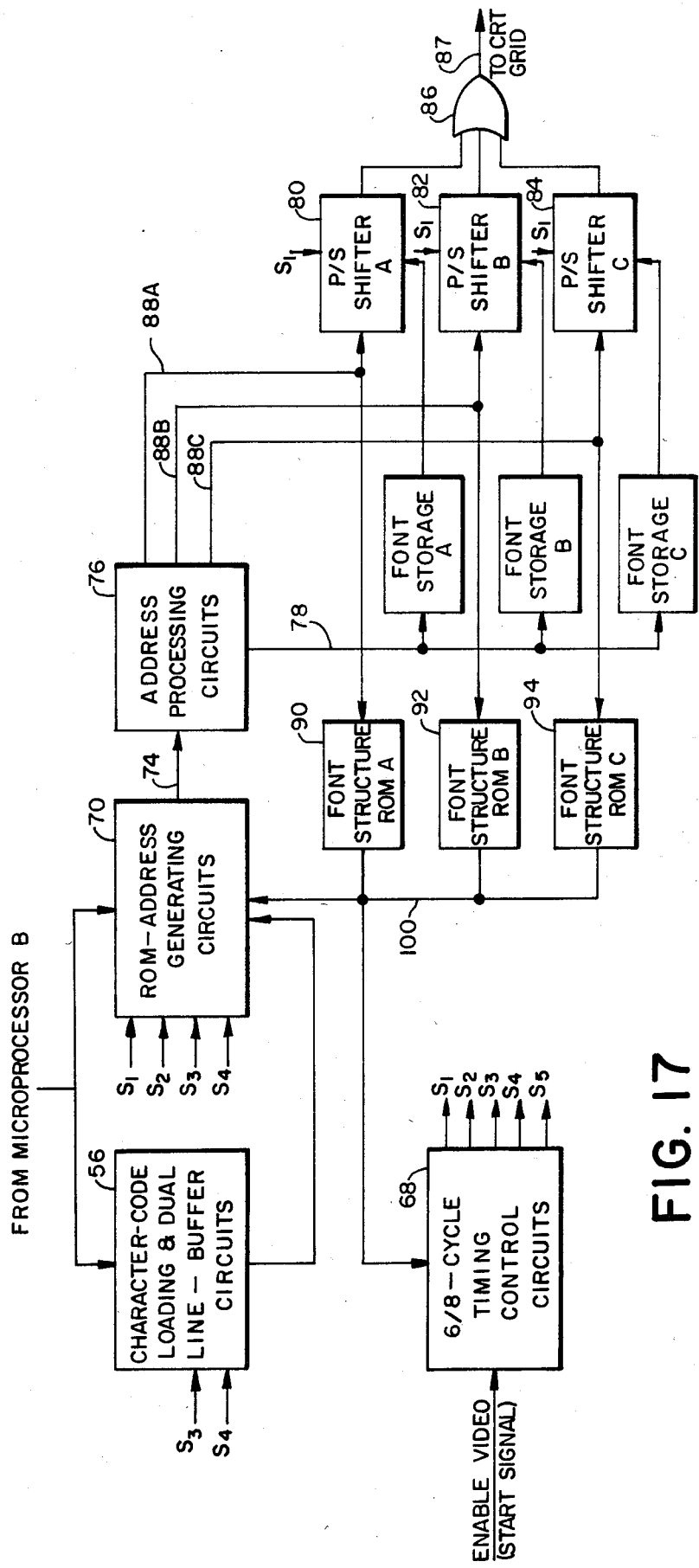
FIG. 17 is a broad block diagram showing the electronic system of the invention in one form.

FIG. 17 shows in broad block form the general layout of a preferred type of system for accomplishing the above-described operations. The latter figure shows the character code loading and dual line-buffer circuits 56 of FIG. 5, the remainder of the diagram corresponding to the font storage and print logic circuits 62 of FIG. 5.

The 6/8-cycle timing control circuits 68 generate the timing control signals $S_1$-$S_5$ for the remainder of the circuitry, and are synchronized from microprocessor B to start electronic scanning of a stored character-row in response to a Video Enable, or "start", signal. As described above, character code loading and dual line-buffer circuits 56 contain two line buffers each of which is capable of temporary storage and controlled readout of information relating to a row of characters to be displayed. Character information identifying the characters of the row, and the font from which each character of the row is to be selected, is supplied from microprocessor B, and while the information as to one row of characters is being transferred out of one of the dual line-buffers and processed, the information as to the next successive character row is being placed into the other line buffer.

The ROM address generating circuits 70 are supplied with timing and sweep count information from the microprocessor B, as well as with character and font information transferred thereto from the dual line-buffers and with timing control signals from timing control circuits 68. In response thereto, ROM-Address generating circuits 70 provide, on output line 74, bits of digital information identifying the character whose slice is then to be displayed and the font from which the character slice is to be taken, as well as bits representing the address location in the character-cell matrix of the first byte of information for that character slice in the appropriate font storage device, the three typical font storage devices on a board being shown as font storage A, font storage B and font storage C.

The address information from ROM address generating circuits 70 is further processed in address processing circuits 76 and supplied in appropriate form to each of the font storage devices over a common address bus 78. Upon command, the proper one of font storage devices A, B and C transfers out the addressed byte of character-slice information into its associated parallel-to-serial shifter 80, 82 or 84, one for each font storage device; the shifters run continuously, and their outputs are connected to OR gate 86 to supply the requisite serial bits of video data over line 87 to the intensity-control circuits 61 of the CRT. The output of the address processing circuits 76 includes information as to the particular font storage device in which the desired character slice is stored and, over a selected one of lines 88A, 88B or 88C, enables loading of the particular parallel-to-serial shifter which is supplied by the font from which slice read-out is then desired, to provide the proper serial-bit data to the intensity-control circuits 61 of the CRT for the character slice then to be displayed.

The font storage devices such as A, B and C have associated with them respective font structure ROM's such as 90, 92 and 94 respectively. Each of these is supplied with character-identifying data from the address processing apparatus 76, and stores within itself information as to the bit width and storage sequence for each character stored in its associated font storage A, B or C. The latter fontstructure ROM's are enabled by the font-selection information over a selected one of the lines 88A, 88B or 88C, and the accessed bits fed back over common output line 100 to the ROM address generating circuits 70 and to the timing control circuits 68. In the address generating circuits, this latter fed back information is used, as will be described, to complete the address. In the timing control circuits the fed-back bits are used to control how many 8-bit byte cycles and how many 6-bit byte cycles are performed by the timing control circuits for the character slice then to be displayed.

Details of Preferred Embodiment and Its Timing

Figure 18A:
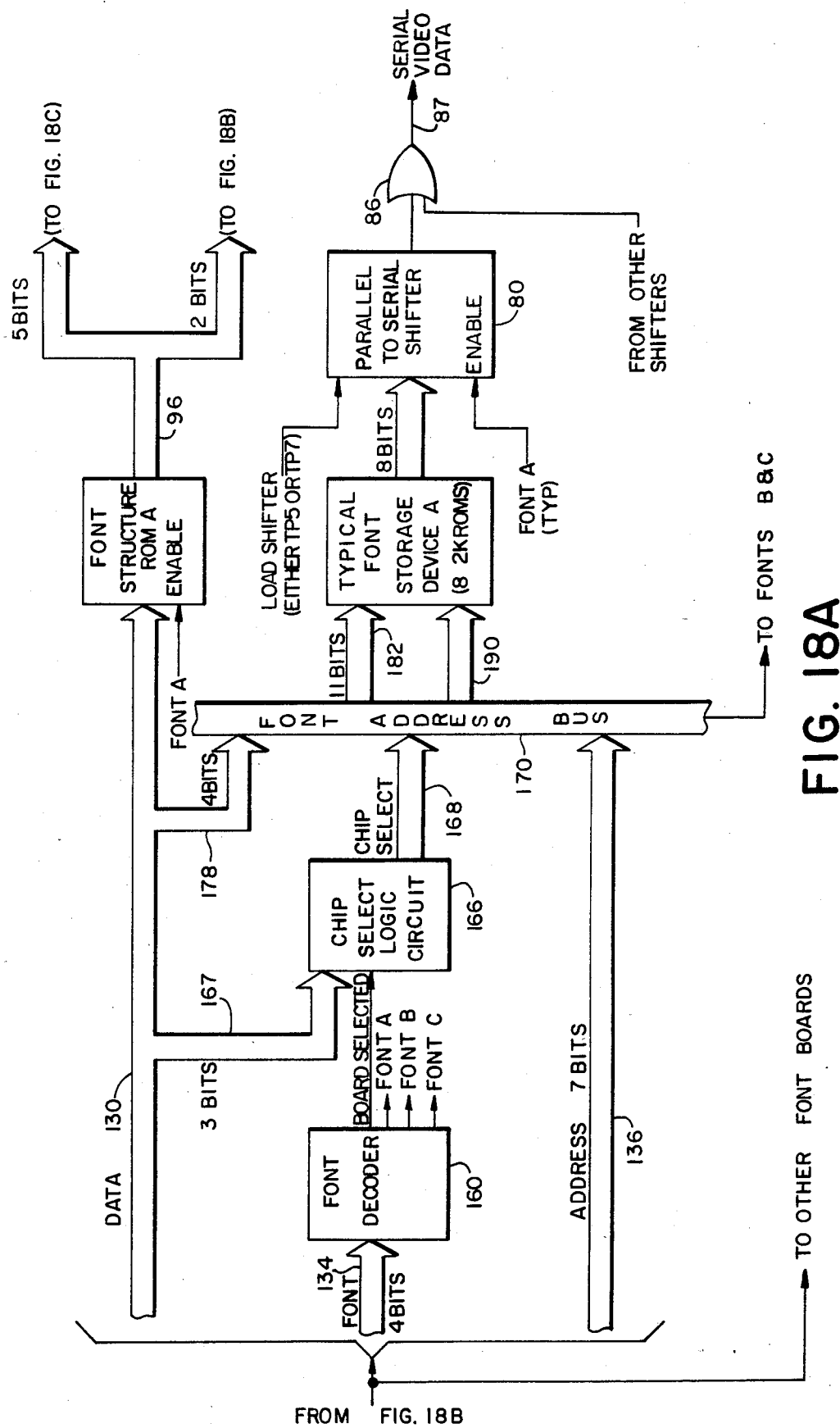
FIGS. 18A, 18B and 18C together constitute a detailed block diagram of the system of FIG. 17.

Having thus outlined the general overall plan of the system, the more detailed nature of the preferred embodiment will now be described with particular reference to the detailed block diagram of FIGS. 18A, 18B and 18C and the wave forms of FIG. 19. In FIG. 18A, only the typical font storage device A and its associated font structure ROM A are shown, it being understood that the other font storage devices and font structure ROM's may be identical except for the information which is stored therein.

The groups of bits representing the character slices are permanently stored in the ROMs of the font storage devices in sets of bytes each containing 8 or 6 significant bits, these bytes being arranged in the locations and sequences previously described. Font structure ROM A may store 128 bytes each corresponding to one of the 128 characters in the eight-ROM, 16K byte font storage device A, so that when addressed by a character code signal it puts out a 7-bit signal, three bits of which represent how many 8-bit bytes are in the corresponding character slice, two bits of which represent how many 6-bit bytes are in the corresponding character slice, and 2 bits of which indicate which of the three possible addressing format sequences is used to access that character from the associated font storage device. The latter three types of output information from font structure ROM A are delivered over output line 100 to the timing control circuits 68 and to the ROM address generating circuits 76 in the manner and for the purposes set forth in detail hereinafter.

As described previously, typical font storage device A, when appropriately accessed, delivers one byte at a time in parallel to the parallel-to-serial shifter 80 for immediately subsequent serial readout onto the common CRT video data line 87 at appropriate times, to represent the character slice then to be displayed. It is the function of the remainder of the apparatus, then, to access the proper set of bytes for the correct character slice in the correct ROM of the correct font, and at the correct time for readout to the CRT.

Considering first the timing control apparatus 68 (FIG. 18C), this includes a print-control logic array (PLA) 102 which is hard-wired in any suitable manner to accomplish the logic functions and control operations to be described. Timing pulses (TP) for the 8- and 6-bit cycles are supplied to PLA 102 by an 6/8-bit timing pulse generator 104. The latter generator preferably comprises an 8-bit multimode shift register which, before operations begin, is held in the parallel load mode by the load shifter signal from the PLA. In this quiescent mode, all of the eight parallel outputs TP0 through TP7 of the timing generator 104 are jammed low (inactive) except for the initial timing signal TP0, which is jammed high at such times. When each sweep begins, an Enable Video (or "start" signal) from microprocessor B is applied to the Set terminal of a first-cycle flip-flop 108, and also used to signal the PLA to unblock timing pulse generator 104 and release it to its shift mode, in response to which the timing pulse generator output sequentially passes through its TP0 through TP7 states. These shifts of state are at the desired bit timing rate. The shift register of generator 104 is not of the recirculating type, and therefore timing pulses will stop unless the register is reloaded. Reloading is done by the Load Shifter signal supplied to the timing pulse generator from the PLA 102, which signal occurs at TP7 of 8-bit cycles and at TP5 of 6-bit cycles (the last bit-time of each cycle). Reloading of the shift register at TP5 prevents the TP6 and TP7 pulses from occurring, and therefore the timing circuit correctly counts the 8 bits for 8-bit cycles and the 6 bits for 6-bit cycles and always starts the next cycle at TP0 as desired. It is noted that the TP7 pulse is also supplied to the reset terminal of the First Cycle FF 108 to reset it. The First Cycle of every sweep is defined to be a "dummy" cycle of 8 bits, and this cycle is necessary in order to obtain the first character code from the line buffers, to make the initial access of the first character slice from the font storage device, and to obtain the character structure from the font storage ROM in order to shift out the character slice correctly. During this cycle, blank or "background" bits are shifted onto the Serial Video Data line 87. The PLA 102 produces, in addition to the Load Shifter signals, and on separate output lines, Latch Data pulses, Latch Control pulses, ROM Select pulses, Step CG ROM pulses, Load Cycle Bits pulses, Step 8 pulses and Step 6 pulses, in that order, for the purposes to be described.

As mentioned, PLA 102 controls production of 6- or 8-bit timing cycle control signals according to the times at which the PLA produces the Load Shifter pulses. In order for the PLA to know which cycle is appropriate, and to produce the Load Shifter signals at the corresponding correct times, there are provided an 8-bit Cycle Counter 110, a 6-bit Cycle Counter 112 and a 6-bit Cycle Flip-Flop 114. Each of the 8-bit and 6-bit cycle counters has a Load input terminal and a Step input terminal, the Load input terminals being supplied with the Load Cycle Bits pulses and the Step input terminals being, respectively, supplied with the Step 8 and Step 6 pulses from the PLA 102; the Set input terminal of the 6-Bit Cycle Flip-Flop 114 is supplied with the Step 6 pulses, and its Reset input terminal is supplied with the Load Cycle Bits pulses. In response to the Load Cycle Bits signal, both of counters 110 and 112 are enabled to be placed in a state which is less than their full count by an amount equal to the number of 8-bit bytes and 6-bit bytes, respectively, in the corresponding character slice. The full states are 1,1,1 for the 8-bit Cycle Counter and 1,1 for the 6-bit Cycle Counter. Assuming for example that the character slice to be accessed has the bit structure 8/6/6, the font structure ROM A supplies the bit input terminal of 8-bit Cycle Counter 110 with 3 bits 0,0,1 indicating that the character-slice format has one 8-bit cycle, and the 8-bit cycle counter is thereby loaded to one bit below its full value, i.e. to 1,1,0. Similarly, since there are two 6-bit bytes in the 8/6/6 byte format, the font structure ROM A supplies the 6-bit Cycle Counter, during its load time, with two bits of information 1,0, which cause the 6-bit cycle to load itself to 0,1, which is two counts below its full value 1,1.

The Step-8 output of the PLA 102 then first supplies 8-bit Cycle Counter 110 with Step 8 pulses to increase its count to its full count, whereupon the 8-bit Cycle Counter supplies to the PLA 102, over line 118, information indicating that it is time to start stepping of the 6-bit Cycle Counter 112. The Step 6 output of the PLA then steps the 6-bit Cycle Counter to increase its count until it is full, and the latter Cycle Counter then supplies to the PLA an indication that the counting of 6-bit bytes is complete. After both the 8-bit and 6-bit Cycle Counters have reached their full count values, they are ready to receive the next Load Cycle Bits signal from the PLA during the next cycle, and to be loaded with signals representing the structure of the next character slice to be represented.

The details of a preferred logic used in the PLA 102 by means of which it provides the above functions, as well as those now to be described, are set forth in detail hereinafter.

Figure 18B:
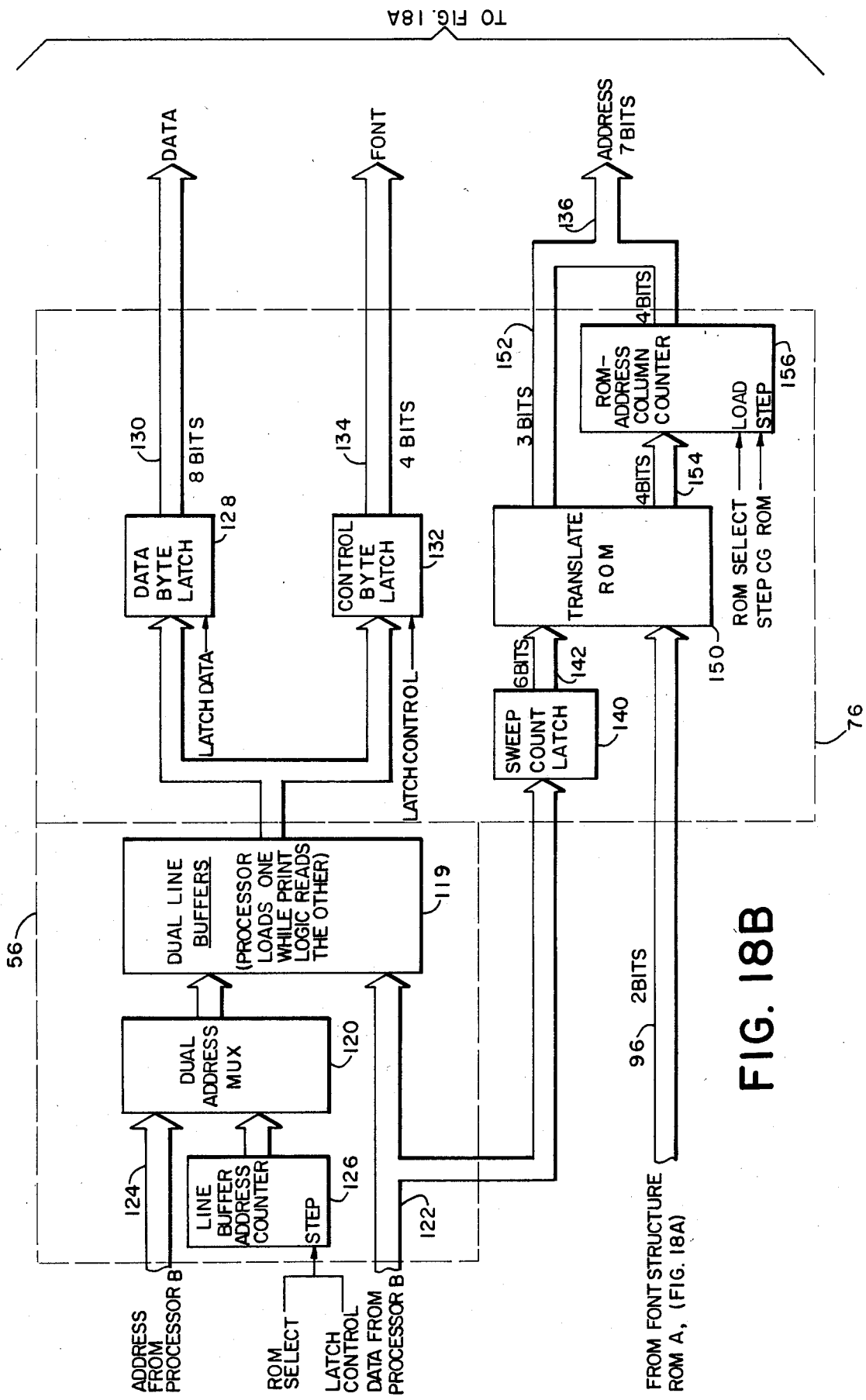

Referring to FIG. 18B, the alternate loadings of the dual line-buffers 119 in circuits 56 is accomplished by dual address multiplexer 120 in response to character data representing the row of characters to be loaded, received from microprocessor B over line 122, and in response to loading address information supplied from microprocessor B over line 124. A line buffer-address counter 126 also supplies an input to the dual address multiplexer 120, and is responsive to successive pulses applied to its Step input to increment by one the address of the character in the line buffer which is presented to the line buffer output at any given time. The data stored in the line buffer for each character contains 8 bits identifying the character and 4 least-significant bits identifying the font in which the character is located; it may also contain other control data not pertinent to the present invention.

Figure 19:
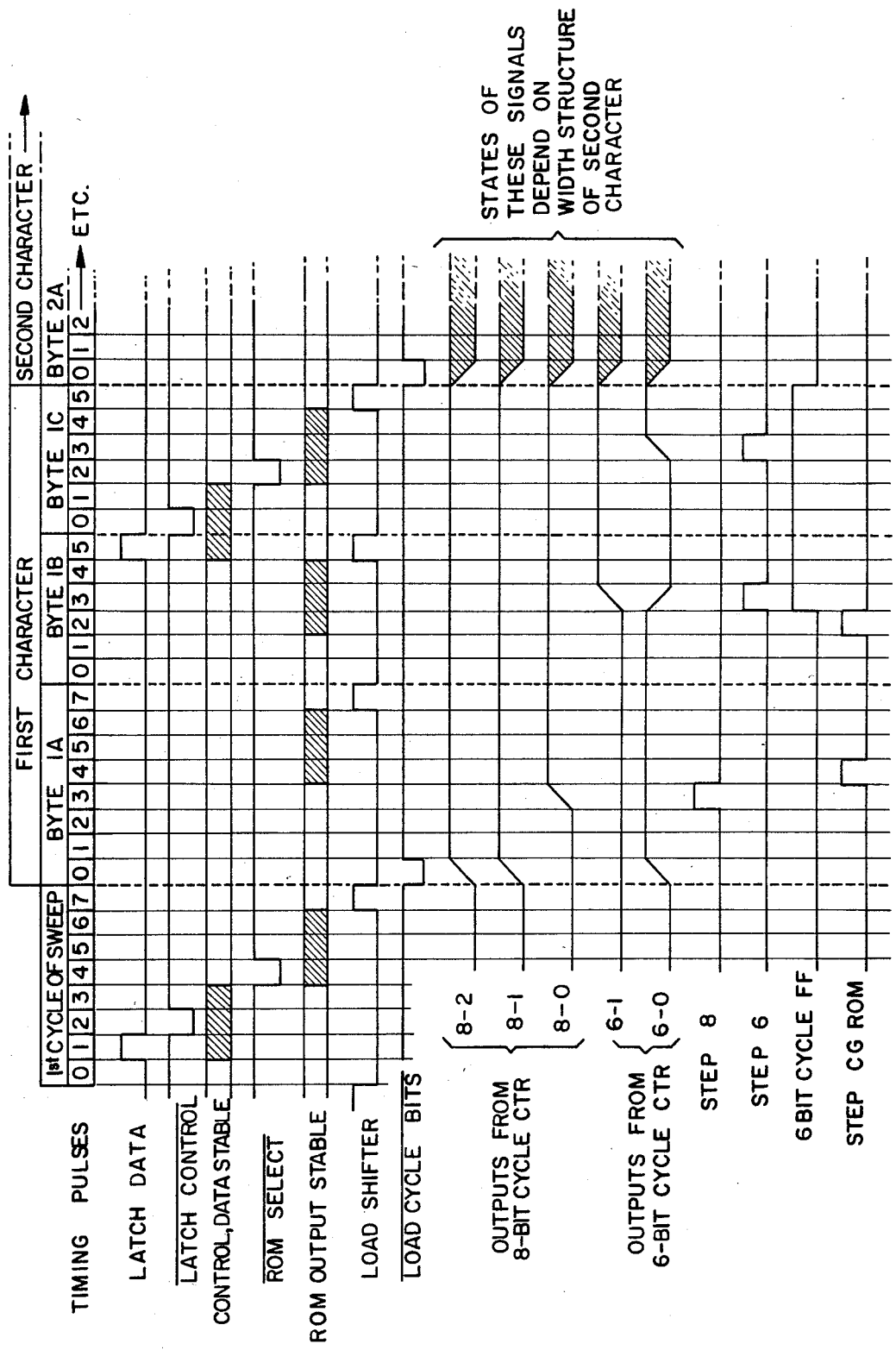
FIG. 19 shows a set of waveforms, in the form of graphical plots with abscissae representing time to a common scale and ordinates representing the values of signals at various points in the system of FIG. 18.

Referring especially to the waveforms of FIG. 19, in the first or "dummy" cycle the first control pulse from the PLA is the Latch Data pulse, which is applied to Data Byte Latch 128 to cause it to register and apply to its output line 130 8 bits of character code data identifying the character whose slice is to be accessed in a font storage device. The timing waveforms of FIG. 19 show the timing of the Latch Data pulses, and of other control signals, for a first 8-bit interval corresponding to the first cycle at the beginning of a sweep, during which it is provided that no character information is present; as shown, this is followed by a first 20-bit character-slice interval having a first byte 1A of 8 bits, a second byte 1B of 6 bits, and a third byte 1C having 6 bits, i.e. a format 8/6/6. The Latch Data pulse occurs at TP1 of the first "dummy" cycle, and is immediately followed at TP2 by a Latch Control signal.

The Latch Control signal is supplied to the Line Buffer Address Counter 126, its leading edge serving to increment the line buffer address by 1. This signal is also supplied to control byte latch 132, which responds by then registering, and outputting to its output line 134, a control byte from the dual line-buffers containing 4 bits which represent the font in which the character slice to be represented is stored. It will be understood that the control byte associated with each byte of character-code may include other bits defining such things as underlining, but for the present purposes such other control bits will not be described, in the interest of clarity. The Latch Control pulse always follows its associated Latch Data pulse by a fixed, short interval. It is noted that if, for example, a 16-bit wide line-buffer had been used to store the character-specific information, both character-code data and control data, including font-selection data could be stored and read out at the same time by a single pulse, and there would be no need for the two separate Latch Data and Latch Control pulses.

The ROM Select pulse occurs next, after a short interval sufficient for the system to stabilize in response to the Latch Control signal; this interval is labelled "Control, Data Stable". The leading edge of the ROM Select signal times the completion of the initial 7-bit character address at output line 136.

To generate the latter 7 bits of address, there is provided a Sweep Count Latch 140, supplied with the progressive sweep count values 1–40 from the microprocessor B, and with a latch signal occurring at the start of every sweep, also from microprocessor B. In response thereto, Sweep Count Latch 140 registers for one sweep period, and supplies on its output line 142, 6 bits of information representing the number of the sweep then being performed.

The 6 bits from the Sweep Count Latch 140 are supplied to a Translate ROM 150, which is also supplied by Font Structure ROM A over line 96 with 2 bits representing which of the three possible format sequences has been used for storage in the font storage devices of the corresponding character whose slice is to be accessed. As may be seen by reference to the character storage organization charts of FIGS. 6 to 16, the sweep number and the format sequence define uniquely where, in the memory area for a given character, the first byte of the corresponding slice of the character is located. For example, for sweep 3 and addressing sequence 0-3-6-9-C, the first byte is located in row 00 and column 6 (see charts for font formats 3A, 3B, 3C, 1 and 3D, 2 and 3E). Accordingly, from the 6-bit sweep information and the 2-bit sequence information supplied to it, Translate ROM 150 is able to produce a 3-bit signal on its output line 152 representing a particular one of the 8 rows in the character format address, and a 4-bit signal on its output line 154 representing a particular column in that character format address, these 7 bits together specifying the address coordinates of the first byte of the particular character slice to be represented.

The latter 4 bits of information from Translate ROM 150 are loaded into the address-column counter 156, the output of which is combined with the 3-bit output from the translate ROM 150 to provide the desired 7 bits of address at output line 136. The leading edge of the ROM Select pulse, which follows the two Latch signals at a fixed short interval, provides the timing for loading counter 156 with the above-mentioned 4 bits; the trailing edge of the ROM Select pulse then increments the line-buffer address counter 126 so that the next Latch Data signal will transfer into Data Byte Latch 128 the character data for the next character-slice in the print line.

Referring to FIG. 18A, the 8-bit character code data on line 130 is supplied to the Font Structure ROM's such as Font Structure ROM A which, as described above, respond by outputting 2 bits which provide the above-described sequence information for the Translate ROM 150, 3 bits which provide the information as to the number of 8-bit bytes in the next character-slice to control operation of the 8-bit Cycle Counter 110, and 2 bits which convey similar information to the 6-bit Cycle Counter with respect to the number of 6-bit bytes in the next character slice.

It is noted that the 4-bit font selection signal from Control Byte Latch 132 is supplied to Font Decoder 160; the latter decoder has a Board Selected output line which is actuated when the 4-bit signal calls for a particular board, and a set of output lines labelled Font A, Font B, Font C, equal to the number of fonts on that board. A Font Selected signal is produced on the appropriate one of the latter three lines when the corresponding font is called for by the 4 bits of the Font Selection signal. Each Font Select output signal is applied to its corresponding Font Structure ROM, e.g. the Font A output of the decoder 160 is supplied to the Font Structure ROM A, to enable production from the latter device of the output signal on line 96 containing the previously-described cycle and sequence information bits for the character slice to be accessed. The Font A, B and C output signals are also supplied to the Enable Terminal of the corresponding shifter 80, for reasons described below.

In order to address the desired character slice in the Font Storage Device, a Chip Select logic circuit 166 is also provided which is supplied over line 167 with 3 bits of the character code identifying which of the chips or ROM's of the selected font is to be addressed, as well as with the signal from decoder 160 which shows that the board containing the desired font has been selected. The Chip Select logic circuit 166 then produces a Chip Select signal on its output line 168 indicative of the location in each font on that board of the 2K ROM to be addressed. The latter Chip Select signal is applied to a common Font Address Bus 170 for delivery to all fonts on the selected board. Each ROM recognizes from the signals on the Font Address Bus whether it is the ROM to be selected.

Also supplied to the Font Address Bus 170 over line 178 are the other 4 bits of the character code supplied over line 130, and the 7-bit address code supplied over line 136 which identifies the location of the first byte of the desired character slice within the particular character-storage matrix for the given character.

More particularly, the Font Address bus 170 supplies each Font Storage Device with 11 bits of address information over individual lines such as 182, to select the proper character-storage area in memory and the first byte to be displayed, and over individual lines such as 190 with the Chip Select information. In response to these addresses, the addressed Font Storage Devices output 8 bits of parallel information, representing the selected first bytes from the addressed ROM's, to the corresponding parallel-to-serial shift registers such as 80. Although this occurs for one ROM in all fonts on the selected board, only the parallel-to-serial shifter then being enabled by a Font Select signal is loaded with data upon the occurrence of the Load Shifter pulse applied to the shifters.

As mentioned previously, the parallel-to-serial shifters run continuously, and although the 8-bit bytes thus read out may contain only 6 significant bits of valid character-slice information, as soon as the 6 valid bits have been shifted out, the 8 bit positions in the parallel-to-serial shifter are then overlayed by the next 8 or 6 bits of valid information, so that any invalid bits are never shifted out.

Figure 18C:
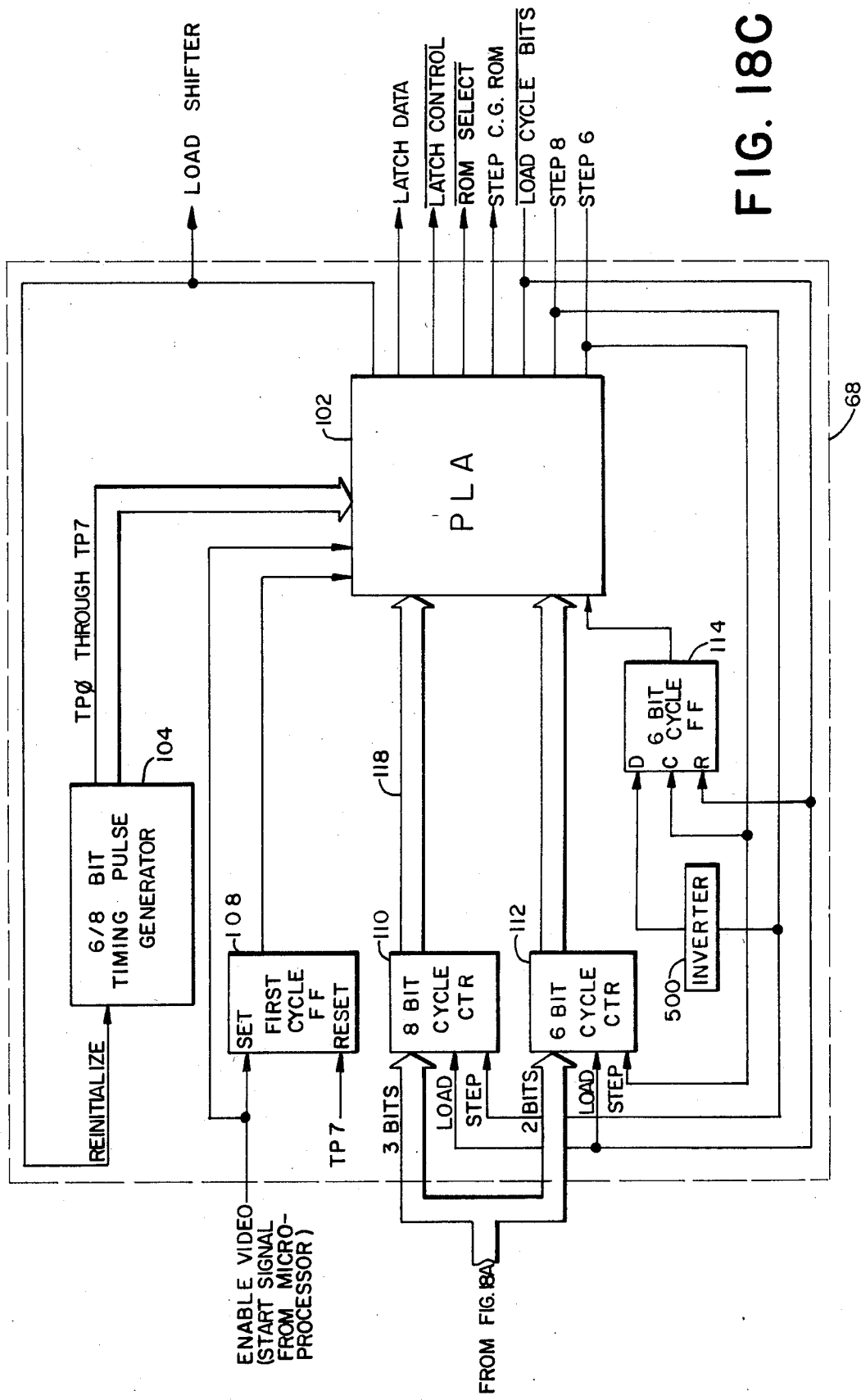

Turning now by way of example to the timing of the system with special reference to FIGS. 18A, 18B and 18C and the waveform diagram of FIG. 19, for the representative case of the Format 1 character of FIG. 10 (20-bit wide character cell with cycle sequence 8/6/6 and addressing sequence 0-3-6-9-C), initially the logic is inactive and the 6/8 Bit Timing Pulse Generator 104 is held in the TP0 state by a continuously high Load Shifter signal from the PLA. When accessing of data for the CRT is to start at the beginning of a line, an Enable Video signal is generated by microprocessor B which sets the First Cycle Flip-Flop 108 and releases the Load Shifter signal generator of the PLA, thereby permitting the Timing Pulse Generator 104 to begin shifting through timing pulse states TP0–TP7. Prior to this time, the parallel-to-serial shifters have been shifting blank (background) bits into the video data stream to the CRT. At TP1 of the first cycle, the Latch Data pulse occurs, which loads the character code of the first character-slice to be printed into the Data Byte Latch 128. At TP2, the Latch Control signal from the PLA 102 causes the control byte associated with the latter data byte to be loaded into the Control Byte Latch 132. This control byte in effect selects the font which contains the character bits to be displayed, and permits the character code to address the Font Structure ROM for that font and cause the latter ROM to output a byte on line 96 which specifies the character structure. TP3 is an inactive time during which signals settle. At TP4, ROM Select occurs, loading the ROM-address column counter 156 with the four least significant bits of the translated sweep count from Translate ROM 150; the 4-bit output of the latter counter completes the initial address for the character generator ROM.

The ROM outputs are permitted to stabilize during TP4, TP5 and TP6, and at TP7 the Load Shifter signal loads the first byte of character-slice data from the appropriate font storage device corresponding to the selected parallel-to-serial shifter. This Load Shifter signal also reinitializes the register in the timing pulse generator 104 so that the next timing pulse will be at TP0. Timing pulse TP7 resets the First Cycle Flip-Flop so that the timing of the output signals from PLA 102 is thereafter controlled by the states of the 8-bit cycle counter 110 and the 6-bit cycle counter 112. At TP0 of the next cycle, the first bit of the first byte of the desired first character slice will appear as video data at the intensity-controlling means for the CRT.

The next print cycle of the logic operates as follows: at TP0, the Load Cycle Bits timing pulse occurs, so that the 2- and 3-bit signals from the Font Structure ROM A are loaded into the 8-bit and 6-bit Cycle Counters 110 and 112 respectively. In the present example in which the character has an 8/6/6 structure, the 8-bit Cycle Counter is loaded with 110 and the 6-bit Cycle Counter is loaded with 01. Signals settle during TP1 and TP2, and at TP3 the PLA generates the Step 8 signal. In response thereto, the 8-bit Cycle Counter advances from 110 to 111 (its final value), and at TP4 the Step Character Generator ROM signal occurs. This signal increments the 4-bit ROM-address column counter 156, and the character-generator ROM outputs change to the next required byte (during all this time, the video shifter has been shifting the first byte out bit-by-bit). At TP7, the parallel-to-serial shifter 80 is loaded with the second byte and it begins to shift out immediately following the first byte. Parallel-to-Serial Shifter 80, and the other shifters, are synchronously loaded devices which permit the loading of new data only at the time of shifting, thereby ensuring that no interruption of its serial data output occurs. This new byte contains only 6 valid bits.

No action occurs during TP0 and TP1 of the 6-bit second byte, but at TP2 the fact that the 8-bit cycles are complete (8-bit cycle counter equals 1,1,1) and the 6-bit cycles are not, causes the PLA 102 to generate the Step CG ROM signal again to increment the character generator ROM address to that of the third (and final) byte. At TP3, the Step 6 signal occurs and the 6-bit Cycle Counter output changes from 01 to 10. The 6-bit Cycle Flip-Flop also sets, and at TP5 the Load Shifter signal loads the final byte of ROM data into the parallel-to-serial shifter, overlaying the final 2 bits of the second byte with the new data. This Load Shifter signal also reinitializes the register in the timing pulse generator so that the next timing pulse will be TP0. The PLA logic recognizes that this is the end of the next-to-last 6-bit cycle (6-bit Cycle Counter equals 10), and at TP5 the Latch Data signal occurs to access the next character code from the line buffer (the line buffer address was incremented earlier by the ROM Select signal).

The next cycle is the final shift-out cycle for the first character-slice to be printed and the set-up cycle for the next character (which may have any width structure). At TP0 the Latch Control pulse occurs as before, followed by ROM Select at TP2. Step 6 occurs at TP3, advancing the 6-bit cycle counter from 1,0 to 1,1 (its final value). The 6-bit Cycle Flip-Flop remains set, so at TP5 the Load Shifter pulse loads the shifter with the first byte of the next character (overlaying the last two bits of the last byte of the first character) and reinitializes the timing pulse generator. The Load Cycle Bits pulse occurs at TP0 of the next cycle to load the cycle counters with new character cycle data, and this signal also resets the 6-bit Cycle Flip-Flop, thereby reestablishing the initial conditions necessary to process the next character regardless of its width structure. The 6-Bit Cycle FF is necessary because the 1,1 state of the 6-bit counter is ambiguous. This state can mean either that the 6-bit cycle counter has completed its count, in which case the timing pulse generator must be reset at TP5, or that the 6-bit cycle counter was never set, in which case the timing pulse generator must be reset at TP7.

In general then, during the first "dummy" cycle of a scan, the parallel-to-serial shifters shift out "blanks" (zero's) while 8 bits containing the first byte of the first selected character slice are being accessed and loaded into one of the shifters. Up to this point, the PLA does not know the format (e.g. 8/6/6), but it does not need to. When serial read-out of the first byte begins, the Load Cycle Bits signal transfers the character-format information to the timing control circuits, before the next byte is addressed and accessed. From the character format information, the PLA determines whether the first byte is of 8-bits or 6-bits; if an 8-bit byte, it permits the shifters to shift out all 8 of the bits previously-loaded into it, before producing a Load Shifter pulse at TP7. If the first byte is of 6-bits, the PLA senses this before TP5 of its serial read-out cycle and produces a Load Shifter pulse at TP5 as desired, to replace the 7th and 8th bits in the shifter with new valid information as to the next byte.

The logic equations by which the PLA controls processing of all character widths are as follows, wherein A = the state of the 8-bit cycle counter
B = the state of the 6-bit cycle counter
X = a "don't care" bit, the + signs represent OR, the product operation represents AND, and the bar above an expression indicates the negative of the function:

(1) LATCH DATA = (First Cycle FF) (TP1) + $\overline{\text{(First Cycle FF)}}$

[(TP1) (A=11∅) (B=11) + (TP5) (B=1∅) (6-Bit Cycle FF)

+ (TP7) (A=111) (B=1∅) $\overline{\text{(6-Bit Cycle FF)}}$ ]

(2) $\overline{\text{LATCH CONTROL}}$ = (First Cycle FF) (TP2) + $\overline{\text{(First Cycle FF)}}$

[(TP2) (A=11∅) (B=11) + (TP∅) (B=1∅) (6-Bit

Cycle FF) + (TP∅) (A=111) (B=1∅) $\overline{\text{(6-Bit Cycle FF)}}$ ]

(3) $\overline{\text{ROM SELECT}}$ = (First Cycle FF) (TP4) + $\overline{\text{(First Cycle FF)}}$

[(TP2) (A=111) (B=1∅) + (TP4) (A=111) (B=11)

$\overline{\text{(6-Bit Cycle FF)}}$ ]

(4) LOAD SHIFTER = TP7 + (TP5) (6-Bit Cycle FF) + $\overline{\text{ENABLE VIDEO}}$ (5) $\overline{\text{LOAD CYCLE BITS}}$ = TP∅ [(A=111) (B=) + (A=∅∅∅) (B=∅∅)]

(6) STEP 8 = $\overline{\text{(First Cycle FF)}}$ (TP3) [(A=∅XX) + (A=X∅X)

+ (A=XX∅)]

(7) STEP 6 = $\overline{\text{(First Cycle FF)}}$ (TP3) (A=111) [(B=∅X) + (B=X∅)]

(8) STEP CG ROM = $\overline{\text{(First Cycle FF)}}$ {(TP2) (A=111) (B=∅X) +

(TP4) [(A=∅XX) + (A=X∅X) + (A=XX∅)] +

(TP4) (A=111) $\overline{\text{(6-Bit Cycle FF)}}$ [(B=∅X)

+ (B=X∅)]}

The significance of these logic equations is as follows.
LATCH DATA:

The first term of equation (1) requires a Latch Data pulse at TP1 of the first or "dummy" cycle; the second term requires a Latch Data pulse thereafter, when the First Cycle Flip-Flop is off, at the following times: (a) at TP1 if the B count is full and the A count is one from full, a condition which occurs at TP1 of the last 8-bit byte if there is no 6-bit byte in the character slice and hence a new character must be addressed; such a TP1 pulse occurs 7 bit-times before serial read-out of the next character must start, leaving ample bit times to access the first byte of the new character and load it into the parallel-to-serial shifters; at TP5 if B is one less than full and the 6-bit Cycle Flip-Flop is on, a condition which occurs during the second-to-last 6-bit byte of a character-slice containing at least two 6-bit bytes; this again places the Latch Data pulse 7 bit-times ahead of the beginning of the serial read-out of the next character must start, (c) at TP7 if the A count is full, the B count is one from full, and the 6-bit Cycle Counter is off, a condition which occurs at TP7 of the second-to-last byte of a character having only one 6-bit byte, such as 8/6, 8/8/6, 8/8/8/6, 8/8/8/8/6 format characters.

Again, the TP7 occurs 7 bit-times before the beginning of serial read-out of the next character.

LATCH CONTROL:
From the discussion of the LATCH DATA logic, it will be apparent that the negative Latch Control pulse always occurs one bit-time after a Latch Data pulse.

ROM SELECT:
A negative ROM SELECT pulse occurs at TP4 of the first "dummy" cycle; thereafter it occurs at TP2 if A is full and B is one below full (i.e. at TP2 of the last 6-bit byte of a character having at least one 6-bit byte), or at TP4 if A and B are both full and the 6-Bit Cycle Flip-Flop is off (i.e. at TP4 if the last byte of the character slice is an 8-bit byte). Thus in each case the ROM Select pulse occurs 4 bit-times before the start of serial read-out of the next character slice.

LOAD SHIFTER:
This signal occurs whenever Enable Video is off; whenever a TP7 pulse occurs; or at TP5 if the 6-Bit Cycle Flip-Flop is on, as it is after TP3 in each 6-bit byte. The load shifter signal therefore always occurs as a pulse in the last bit time of each byte, and as a level signal when Enable Video is off, thereby causing continuous loading, i.e. blocking, of the 6/8 Bit Timing Pulse Generator.

LOAD CYCLE BITS:
This pulse occurs at TP0 whenever A and B are both full or both empty, i.e. at TP0 of the first byte of each character and at TP0 of the first load cycle after "power on" of the printer, when the 8-bit cycle counter and the 6-bit cycle counters are cleared to $\emptyset\emptyset\emptyset$ and $\emptyset\emptyset$, respectively.

STEP 8:
This pulse occurs at TP3 if the First Cycle Flip-Flop is not set and the 8-bit Cycle Counter is not in its full state; this increments the 8-bit Cycle Counter once each byte-cycle, except for the first or "dummy" cycle.

STEP 6:
This pulse occurs at TP3 when the A count is already full and the B count is not full—i.e. when the 8-bit byte count is complete and the 6-bit byte count is not. It does not occur during the "dummy" cycle.

The Step-6 pulses are also used to set the 6-Bit Cycle Flip-Flop. Typically, a "spike" may undesirably be produced on the Step-6 output lead late in the TP3 period in which the 8-bit Cycle Counter changes to its full state if the 6-bit cycle counter is not full, whereas the Step-6 pulse is intended to occur in the next TP3 bit time. While this spike occurs too late to improperly step the 6-Bit Cycle Counter, it tends undesirably to set the 6-bit Cycle Flip-Flop. This is prevented by permitting the 6-Bit Cycle Flip-Flop to set only when the Step-8 pulse is not present. This is accomplished in this example by using as flip-flop 114 a CR (data, clock, reset) flip-flop which can be set by a Step-6 pulse applied to its C terminal only when there is no Step-8 pulse at the Step-8 PLA output line. To accomplish this, the Step-8 output line is connected through an inverter 500 to the D terminal of flip-flop 114, thereby to permit setting of the flip-flop only when the D terminal is supplied with a signal from the inverter indicating the absence of the Step-8 pulse.

STEP CG ROM:
This pulse is used to advance the address to that of the next-subsequent byte of a character slice, and occurs 4 TP's prior to every byte but the first byte of a character slice. How Equation (8) provides this operation will be apparent from the above explanations of the significance of the other equations.

In the interest of clarity, the invention has been described using the example of a portrait font having cell structure of 40 lines (sweeps) in height and variable in width; this example typifies the printing of characters from formats No. 1–3G, inclusive. It will be evident from Table 1, however, that the printing of characters from other fonts may require a number of sweeps other than 40, e.g., 28 sweeps in Format No. 7, in accordance with the sweep count signals on line 64 from microprocessor B.

In particular, accessing and printing of character bytes in Format No. 7 proceeds in much the same way as hereinbefore described, with the exception that the Sweep Count Latch 140, after latching at sweep count No. 28 and at the conclusion of printing sweep 28, resets to sweep No. 1 of the next character row, and does not reach sweep counts No. 29–40. In the same fashion, Format No. 4 requires only 18 sweeps, Format No. 5 requires 20 sweeps, Format No. 6 requires 24 sweeps, and other formats not listed on Table 1 may require other numbers of sweeps, depending on the cell height of the particular font.

The control functions of microprocessor B, in determining the correct sweep number at which to reset the sweep count latch 140, are known in the art and therefore will not be discussed in depth herein; for example, the maximum sweep count number may be hard-wired in the local ROM storage of the microprocessor in the case of fonts stored in non-plug-in storage ROM's, or the maximum sweep count number may be identified by the microprocessor through a software polling process in the case of replaceable plug-in font storage ROM's each containing stored information as to the sweep count numbers appropriate for it.

For electronic printing in the landscape format, microprocessor B reads, through line 51, successive vertical columns of characters from the four-page buffer 50. Each slice of each character, in the landscape format, is taken along the vertical dimension of the character, so that the number of bits in that slice (which is made up of 6- and 8-bit bytes) corresponds here to the cell "width", whereas the number of sweeps through the character cell (which is the width dimension of the character) corresponds to the cell height.

The cell height or total number of sweeps, for each character along the scan line, must remain constant because the CRT must be fed complete lines of significant data during each scan. However, the cell height for different rows of characters on a page may be varied, as long as all characters encountered within each scan have the same sweep number at all times. In landscape format printing, where the cell height corresponds to the "width dimension" of an alphanumeric character, it is the character width (cell height) that cannot be varied, due to the nature of CRT scanning; consequently there is no proportional spacing font in landscape format.

In exceptionally large font formats, such as the largest characters in proportional spacing, all of the allotted font storage may be taken up by sweeping less than the total character cell. In Font Nos. 3F and 3G, which have very large character cells, only sweeps 1–32 are stored in Font Storage ROM. Printing of the entire character cell is accomplished by jamming to zero the output slice-representing bytes for sweeps 33–40 of characters in these two Fonts.

Also in the interest of clarity, the invention has been described herein in detail as it may be applied to an electronic printer which does not print superscripts or subscripts, an embodiment which is nevertheless useful for many purposes. It will be understood that in other applications special provisions may be used to provide for superscripts and subscripts. Such special provisions may include, in portrait font, dividing each character row into half-rows, treating such resulting upper-half and lower-half rows separately in the printing process, and using a special bit in the character code to indicate whether the upper or lower half of any particular character is to be printed. Provision of superscript and subscript in the landscape format would entail the insertion of blank half-characters at appropriate locations to shift up or down the position of the superscript or subscript.

Accordingly, it will be seen that there has been provided a system in which character-slice information is permanently stored in bytes of two different significant-bit contents, e.g. sizes, preferably in 8-bit and 6-bit bytes as defined herein, and the bytes are accessed and read out serially to the CRT with the significant bits of the 6-bit bytes and the bits of the 8-bit bytes adjacent each other, and with the advantages previously described. To accomplish this, the system is provided with a timing system which is capable of producing 8-bit or 6-bit cycles of operation, and which automatically operates in its 8-bit cycle mode when 8-bit bytes are to be read out and in its 6-bit cycle mode when 6-bit bytes are to be read out. Preferably each character-storage font has associated with it a font-structure ROM which stores the byte structure identification and an identification of the storage-format sequence for each character in its associated character-storage font. The cell structure information is used to control the operation of the 8-bit and 6-bit cycle counters, which in turn control the sequential operation of the entire printing logic.

It will be understood that the invention has been described with particular regard to specific embodiments thereof in the interest of complete definiteness, but it may be embodied in a variety of forms diverse from those specifically shown and described without departing from the spirit and scope of the invention as defined by the appended claims.

TABLE I

Electronic Printer Font Formats

| Format No. | Orientation | CPI | LPI | Cell Bits Wide × High | Comment |
|---|---|---|---|---|---|
| 1 | Portrait | 12 | 6 | 20 × 40 | |
| 2 | Portrait | 10 | 6 | 24 × 40 | |
| 3A | Portrait | PS | 6 | 8 × 40 | |
| 3B | Portrait | PS | 6 | 12 × 40 | |
| 3C | Portrait | PS | 6 | 16 × 40 | |
| 3D | Portrait | PS | 6 | 20 × 40 | Same as Format 1 |
| 3E | Portrait | PS | 6 | 24 × 40 | Same as Format 2 |
| 3F | Portrait | PS | 6 | 28 × 40 | |
| 3G | Portrait | PS | 6 | 32 × 40 | |
| 4 | Landscape | 13.3 | 8.57 | 28 × 18 | |
| 5 | Landscape | 12 | 6 | 40 × 20 | Format 1 rotated |
| 6 | Landscape | 10 | 6 | 40 × 24 | Format 2 rotated |
| 7 | Portrait | 13.3 | 8.57 | 18 × 28 | Format 4 rotated |

Note:
Formats 3A through 3G are all part of one font-proportional spacing.

TABLE II

| Format | Width |
|---|---|
| 3A | 8 bits = 1 byte |
| 3B | 12 bits = 1 byte + 4 bits |
| 3C | 16 bits = 2 bytes |
| 7 | 18 bits = 2 bytes + 2 bits |
| 1 & 3D | 20 bits = 2 bytes + 4 bits |
| 2 & 3E | 24 bits = 3 bytes |
| 3F & 4 | 28 bits = 3 bytes + 4 bits |
| 3G | 32 bits = 4 bytes |
| 5 & 6 | 40 bits = 5 bytes |

TABLE III

| Bit Width of Cell | Cycle Sequence | Comment |
|---|---|---|
| 8 | 8 | Format 3A |
| 12 | 6/6 | Format 3B |
| 14 | 8/6 | |
| 16 | 8/8 | Format 3C |
| 18 | 6/6/6 | Format 7 |
| 20 | 8/6/6 | Formats 1 & 3D |
| 22 | 8/8/6 | |
| 24 | 8/8/8 | Formats 2 & 3E |
| 26 | 8/6/6/6 | |
| 28 | 8/8/6/6 | Formats 3F & 4 |
| 30 | 8/8/8/6 | |
| 32 | 8/8/8/8 | Format 3G |
| 34 | 8/8/6/6/6 | |
| 36 | 8/8/8/6/6 | |
| 38 | 8/8/8/8/6 | |
| 40 | 8/8/8/8/8 | Formats 5 & 6 |

I claim:

1. The method of storing and accessing groups of bits of digital information, each of said groups representing a slice through one of a plurality of different characters and containing a number of bits which depends on the character represented, at least some of said groups containing at least 12 bits, said method comprising:
   storing said slice-representing groups of bits in a slice-storage memory device in bytes, some of which bytes contain 8 of said bits and some of which contain 6 of said bits, and at least some of said slice-representing groups of bits comprising at least one 8-bit byte and at least one 6-bit byte, the number of said 8-bit bytes and the number of said 6-bit bytes in each group of bits being chosen to equalize the number of bits in the group with the number of bits in the corresponding character slice; and
   accessing said slice-representing groups of bits on a byte-by-byte basis in response to address information derived from received character-specific digital signals.

2. The method of claim 1, wherein said accessing comprises controllably generating at different times groups of 8 or 6 timing pulses depending on whether 8-bit or 6-bit bytes are to be accessed, and applying said timing pulses to control said accessing so that all of the bits of slices of different characters are sequentially read out serially to a common output line in immediately successive bit times.

3. The method of claim 2, wherein said generation of 8-bit or 6-bit groups of timing pulses is controlled by storing, in said another addressable memory means, information as to the numbers of 8-bit and 6-bit bytes in which the bits of each character are stored in said slice-storage memory device, addressing said another addressable memory means in response to said received character-specific digital signals to produce an output control signal representing said numbers of 8-bit and 6-bit bytes for the character slice to be accessed, and applying said output control signal to control said generation of said groups of 6-bit or 8-bit timing pulses.

4. The method of claim 3, wherein said output control signal comprises first bits representing the number of 8-bit bytes and other bits representing the number of 6-bit bytes in the character slice to be accessed, and said controlling of generation of said 8-bit or 6-bit groups of timing pulses is performed in response to said first bits and said other bits.

5. The method of claim 1, wherein the bytes representing all of the slices of each one of said characters are stored at consecutive addresses in said slice-storage memory device, without interleaving of bytes representing other slices, and said bytes representing any given character slice are accessed by deriving, in response to said character-specific digital signals, the storage address of the first byte of the group of slice-representing bits to be accessed, using said storage address to access said first byte, and thereafter incrementing said address a number of times sufficient to complete accessing of the other bytes representing the character slice to be accessed.

6. The method of claim 5, wherein for each of said characters said bytes representing the slices of said each character are stored in said slice-storage memory device in a matrix having row and column address coordinates, with a plurality of slices having the same row address, and with all of the bytes for each slice of a character having the same row address and the first bytes of all slices for a character being located according to a column address sequence such that the column addresses of the first bytes are the same for all row addresses.

7. The method of claim 6, wherein said sequence is the same for some of said characters but different for other characters, the number of different sequences being small compared with the number of different characters.

8. The method of claim 7, wherein the number of said different sequences is 3.

9. The method of claim 7, wherein said accessing of said first byte comprises generating a count signal indicative of the slice whose bytes are to be accessed, generating a sequence signal representing that one of said different sequences according to which the bytes of the character to be accessed are arranged in said slice-storage memory device, deriving from said count signal and said sequence signal a matrix address signal representing the row and column address coordinates of the first byte of the slice to be accessed, and applying said matrix address signal to said slice-storage memory device to access said first byte to be accessed.

10. The method of claim 9, wherein said generating of said sequence signal comprises storing, in another addressable memory means, information for each of said characters as to said sequence according to which said bytes of said characters are stored, and addressing said other addressable memory means in response to said received character-specific information to read-out therefrom the sequence signal corresponding to the character whose slice is to be accessed.

11. In a system comprising:
memory means for storing bits of information representing different characters, said bits being stored in said memory means as a set of bytes for each character;
different ones of said sets of bytes containing different numbers of significant bits depending upon the character represented by the set of bytes; and
means for accessing said bytes and for printing said characters in response to the accessed bytes,
the improvement wherein
at least some of said sets of bytes are composed of whole numbers of x-bit bytes and y-bit bytes, x and y are different integers, and x and y represent the number of significant character-representing bits in said bytes, each of at least some of said sets comprising both x-bit bytes and y-bit bytes and containing a number of x-bit bytes and y-bit bytes which equalizes the number of bits in each set with the number of bits in each corresponding character slice.

12. The system of claim 11, wherein each of at least some of said sets of bytes comprises both x-bit bytes and y-bit bytes.

13. The system of claim 11, wherein x and y differ by 2.

14. The system of claim 13, wherein x=8 and y=6.

15. Digital character storage means, comprising:
a slice-storage memory device having a plurality of character storage areas each storing groups of information bits organized into bytes, each of said groups representing a different slice through a particular one of a plurality of different characters;
at least some of said groups of bits being composed of an integral number of bytes, some of which bytes are made up of x significant slice-representing bits and some of y significant slice-representing bits, where x and y are different integers.

16. The storage means of claim 15, wherein x=8 and y=6.

17. The storage means of claim 16, wherein within at least some of said character storage areas each of said group of bits is organized into N 8-bit bytes and M 6-bit bytes, and N and M each have the same respective values for all of said groups of bits in the same character storage area.

18. The storage means of claim 17, wherein at least one of N and M differs in value as between at least some of said character storage areas.

19. The storage means of claim 18, wherein the bytes corresponding to each character slice are stored at consecutive address locations in its character storage areas.

20. The storage means of claim 18, wherein each of said bytes is located in its character storage area at a matrix location addressable by a row address and a column address with a plurality of slices having the same row address, the bytes for each character slice being at the same row address and at successive column addresses without interleaving between them of bytes representing other slices.

21. The storage means of claim 20, wherein the first bytes for all character slices in any one of said character storage areas are at the same column address.

22. In a system comprising:
permanent-memory character-storage apparatus for permanently storing information as to a plurality of characters;
cathode-ray tube apparatus comprising a cathode-ray tube including a display screen, means for scanning said screen with a cathode-ray beam repetitively in successive sweeps, and means responsive to character-representing bit signals for controlling the intensity of said beam as it executes said sweeps to display on said screen a row of characters selected from said character-storage apparatus;

a source of character-selection signals representative of characters to be displayed on said screen;

character-storage access and read-out means responsive to said character-selection signals for accessing and reading out, from said character-storage apparatus, character-representing signals representing said selected characters and for applying said character-representing signals to said intensity-controlling means to form said selected characters on said screen;

said character-information being so stored in said character-storage apparatus, and said access and read-out means being so constructed, that as said beam executes said sweeps its intensity is controlled to represent the portions of said selected characters contained in successive slices extending through them corresponding to the sweeps being executed by said beam;

the number of bits stored in said character-storage apparatus to represent each said slice being an even number at least as great as 6 and excluding 10, and differing as between at least some different characters;

the improvement wherein:

said character-storage means comprises means for permanently storing information as to each of said slices through each of said characters in the form of an integral number of bytes, the bytes of at least some of said slices containing 8 character-representing bits and others containing 6 character-representing bits, the number of 8-bit bytes and the number of 6-bit bytes for each slice being chosen to equalize the number of bits in said each slice with the number of stored bits representing said each slice; and said access and read-out means are responsive to said character-selection signals to read out from said character-storage apparatus bytes of information as to each slice of each of said selected characters.

23. An electronic printing apparatus comprising font storage means storing bytes of data bits arranged in predetermined memory areas, each memory area containing data bits representing slices of a different form of character, a cathode-ray tube having a screen and means for deflecting the cathode-ray beam repetitively across said screen in successive sweeps, accessing means responsive to received data representative of characters to be displayed for accessing said font storage means to read out therefrom data bits representative of successive slices of said characters, and data-processing means for applying said read-out data bits serially to said cathode-ray tube to vary the intensity of said beam during said sweeps and thereby display on said screen said successive slices of said characters, said characters differing with respect to the number of said stored data bits representing a slice through the character, the improvement wherein:

for at least some of said characters, said number of stored data bits representing said slices is equal to N bytes of x significant bits each plus M bytes of y significant bits each, N and M being integers greater than zero, and x and y being integers differing from each other, the values of N and M being chosen to equalize the number of bits Nx+My with the number of bits in the corresponding character slice.

24. In the electronic printing of characters, the method of storing, accessing and displaying character-representing information as to a plurality of different characters, in and from a computer memory, comprising:

(a) permanently storing said character-representing information in the form of sets of an integral number of bytes, at least some of said sets containing a combination of 6-bit and 8-bit bytes and representing the character information for a particular slice through a particular character and being separately addressable according to the character and slice which it represents, the number of 6-bit bytes and the number of 8-bit bytes used to represent each slice being selected to equalize the number of bits in the set with the number of bits in the corresponding character slice;

(b) selectively addressing each of said sets of bytes according to the character and slice which it represents, to read out the corresponding character-slice bytes, and (c) displaying said read-out bytes along a scan of a scanning type of image-display device to reproduce the character information corresponding to the read-out set of bytes.

25. In a byte-organized system for storing and accessing groups of character-representing data bits, each group of said bits representing a different character slice to be accessed and reproduced, the improvement comprising:

means for storing at least some of said groups of character-slice representing bits in a plurality of bytes which differ from each other with respect to their bit sizes, the number of bytes of each bit size being chosen to equalize the number of bits in each group with the number of bits in the corresponding character slice; and means for accessing each of said stored groups on bits on a byte-by-byte basis to form a bit stream comprising evenly time-spaced bits representing each of said slices.

26. The system of claim 25, wherein the number of bits in each of said at least some groups is equal to the sum of an integral number of complete bytes.

27. The system of claim 26, wherein at least some of said groups of bits comprise bytes differing from each other by 2 in bit size.

28. The system of claim 27, wherein at least some of said groups of bits comprise both 6-bit and 8-bit bytes.

* * * * *